(12) United States Patent
Nam et al.

(10) Patent No.: US 12,155,118 B2
(45) Date of Patent: Nov. 26, 2024

(54) ELECTRONIC DEVICE INCLUDING ANTENNA FOR SUPPORTING MULTIPLE COMMUNICATIONS

(71) Applicant: SAMSUNG ELECTRONICS CO., LTD., Suwon-si (KR)

(72) Inventors: Janghyun Nam, Suwon-si (KR); Geonwoo Kim, Suwon-si (KR); Gyesung Wang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 122 days.

(21) Appl. No.: 17/966,888

(22) Filed: Oct. 17, 2022

(65) Prior Publication Data

US 2023/0100731 A1 Mar. 30, 2023

Related U.S. Application Data

(63) Continuation of application No. PCT/KR2022/011604, filed on Aug. 5, 2022.

(30) Foreign Application Priority Data

Sep. 24, 2021 (KR) .................. 10-2021-0126671

(51) Int. Cl.
*H01Q 1/50* (2006.01)
*H01Q 1/24* (2006.01)
(Continued)

(52) U.S. Cl.
CPC .............. *H01Q 1/50* (2013.01); *H01Q 1/243* (2013.01)

(58) Field of Classification Search
CPC ............ H01Q 1/50; H01Q 1/243; H01Q 3/24; H01Q 9/04; H01Q 21/28; H04B 1/00;
(Continued)

(56) References Cited

U.S. PATENT DOCUMENTS 7,142,824 B2 11/2006 Kojima et al.
7,570,938 B2 8/2009 Kwon
(Continued)

FOREIGN PATENT DOCUMENTS

CN 113169442 A 7/2021
KR 10-2006-0019744 A 3/2006
(Continued)

OTHER PUBLICATIONS

International Search Report mailed PCT/KR2022/011604 for Nov. 11, 2022.
(Continued)

*Primary Examiner* — Minh D A
(74) *Attorney, Agent, or Firm* — CANTOR COLBURN LLP

(57) ABSTRACT

An electronic device includes a first communication circuit including a first transmission port which outputs a transmission signal of first communication and a first reception port which receives a reception signal of the first communication, a second communication circuit including a second transmission port which outputs a transmission signal of second communication and a second reception port which receives a reception signal of the second communication, a first branching filter connected to a first antenna and the first communication circuit, a second branching filter connected to a second antenna and the first communication circuit, a first switch connected to the second communication circuit through the second transmission port and the second reception port and connected to switch between the first branching filter, the second branching filter, and a third antenna, and a fourth antenna connected to the second communication circuit through the second reception port.

20 Claims, 9 Drawing Sheets

(51) Int. Cl.
*H01Q 3/24* (2006.01)
*H04B 1/44* (2006.01)

(58) Field of Classification Search
CPC ...... H04B 1/0053; H04B 1/0458; H04B 1/18; H04B 1/401; H04B 1/44; H04B 1/52
See application file for complete search history.

(56) References Cited

U.S. PATENT DOCUMENTS

| | | | |
|---|---|---|---|
| 8,019,304 | B2 | 9/2011 | Liu et al. |
| 8,441,410 | B2* | 5/2013 | Robert ............... H01Q 3/24 |
| | | | 343/893 |
| 9,503,173 | B2 | 11/2016 | McCarthy et al. |
| 9,867,194 | B2* | 1/2018 | Kadous ............... H04W 28/04 |
| 10,075,198 | B1 | 9/2018 | Lee et al. |
| 2008/0261647 | A1 | 10/2008 | Hamada |
| 2012/0329395 | A1 | 12/2012 | Husted et al. |
| 2017/0163293 | A1* | 6/2017 | Lee ............... H04B 1/0057 |
| 2018/0199342 | A1 | 7/2018 | Rai et al. |
| 2018/0205253 | A1* | 7/2018 | Kwak ............... H02J 7/0032 |
| 2020/0185818 | A1 | 6/2020 | Kim et al. |
| 2021/0013910 | A1 | 1/2021 | Ono et al. |
| 2021/0075115 | A1 | 3/2021 | Kim et al. |
| 2021/0167809 | A1 | 6/2021 | Xu et al. |
| 2021/0218422 | A1 | 7/2021 | Pehlke |

FOREIGN PATENT DOCUMENTS

| | | |
|---|---|---|
| KR | 10-2014-0037237 A | 3/2014 |
| KR | 10-2015-0109884 A | 10/2015 |
| KR | 10-2017-0065907 A | 6/2017 |
| KR | 10-2021-0001663 A | 1/2021 |
| KR | 10-2021-0029363 A | 3/2021 |

OTHER PUBLICATIONS

The extended European search report for EP Application No. 22873100.6 mailed on Sep. 24, 2024.

* cited by examiner

ELECTRONIC DEVICE INCLUDING ANTENNA FOR SUPPORTING MULTIPLE COMMUNICATIONS

TECHNICAL FIELD

Various embodiments disclosed herein relate to an electronic device for supporting multiple communication schemes, and relate to an electronic device for performing multiple types of communication by an identical antenna.

BACKGROUND ART

Various electronic devices such as a smartphone, a tablet personal computer (tablet "PC"), a portable multimedia player ("PMP"), a personal digital assistant ("PDA"), a laptop PC, or a wearable device are widely being used.

Recent electronic devices support cellular communication including new radio ("NR"), long-term evolution ("LTE"), third-generation cellular communication, and second-generation cellular communication, and short-range wireless communication including Wi-Fi, Bluetooth, or ultra-wide band ("UWB") communication. Whenever supported communication schemes increase, the number of front-end modules ("FEM") or antennas for receiving or outputting signals corresponding to the supported communication schemes may increase.

DISCLOSURE OF INVENTION

Technical Problem

Recently, in order to support various communication schemes, the number of antennas or front-end modules for receiving or outputting signals corresponding to the communication schemes may increase as communication schemes supported by an electronic device increase. When the number of antennas or front-end modules increases, a space desired to arrange the antennas or the front-end modules in the electronic device may increase. In a situation in which a size of the electronic device is limited, the increase in the arrangement space for the antennas or the front-end module may cause a reduction of an arrangement space for other components.

The space for arranging antennas or front-end modules in the electronic device is limited, and thus when the number of antennas increases, the distance between the antennas may decrease. When the distance between the antennas decreases, interference may be caused between the antennas, and thus communication performance may be reduced.

In an embodiment of an electronic device including an antenna and a front-end module according to the invention, the antenna or the front-end module may be commonly used for types of communication, in which frequency bands partially overlap each other, among various types of communication, thereby improving communication performance and reducing a space occupied by a component.

Solution to Problem

An embodiment of an electronic device disclosed herein includes a first communication circuit including a first transmission port which outputs a transmission signal of first communication and a first reception port which receives a reception signal of the first communication, a second communication circuit including a second transmission port which outputs a transmission signal of second communication and a second reception port which receives a reception signal of the second communication, a first branching filter connected to a first antenna and the first communication circuit, a second branching filter connected to a second antenna and the first communication circuit, a first switch connected to the second communication circuit through the second transmission port and the second reception port and connected to switch between the first branching filter, the second branching filter, and a third antenna, and a fourth antenna connected through the second reception port. The second communication circuit controls the first switch to perform a first function through which a transmission signal of the second communication is transmitted by one of the first antenna and the second antenna and, simultaneously with the transmission, a reception signal of the second communication is received by a remaining one of the first antenna and the second antenna, controls the first switch to perform a second function through which a transmission signal of the second communication is transmitted by one antenna of the first antenna and the second antenna and a reception signal of the second communication is received by the one antenna, and controls the first switch to perform a third function through which a reception signal of the second communication is received by the third antenna and the fourth antenna.

Advantageous Effects of Invention

In an embodiment, the electronic device according to the invention may use an identical antenna to perform first communication and second communication, in which some frequency bands overlap each other. Therefore, a space occupied by the antenna may be reduced compared with an embodiment in which both an antenna for supporting the first communication and an antenna for supporting the second communication are arranged.

BRIEF DESCRIPTION OF DRAWINGS

In describing the drawings, identical or similar reference numerals may be used to denote identical or similar elements.

MODE FOR THE INVENTION

Figure 1:
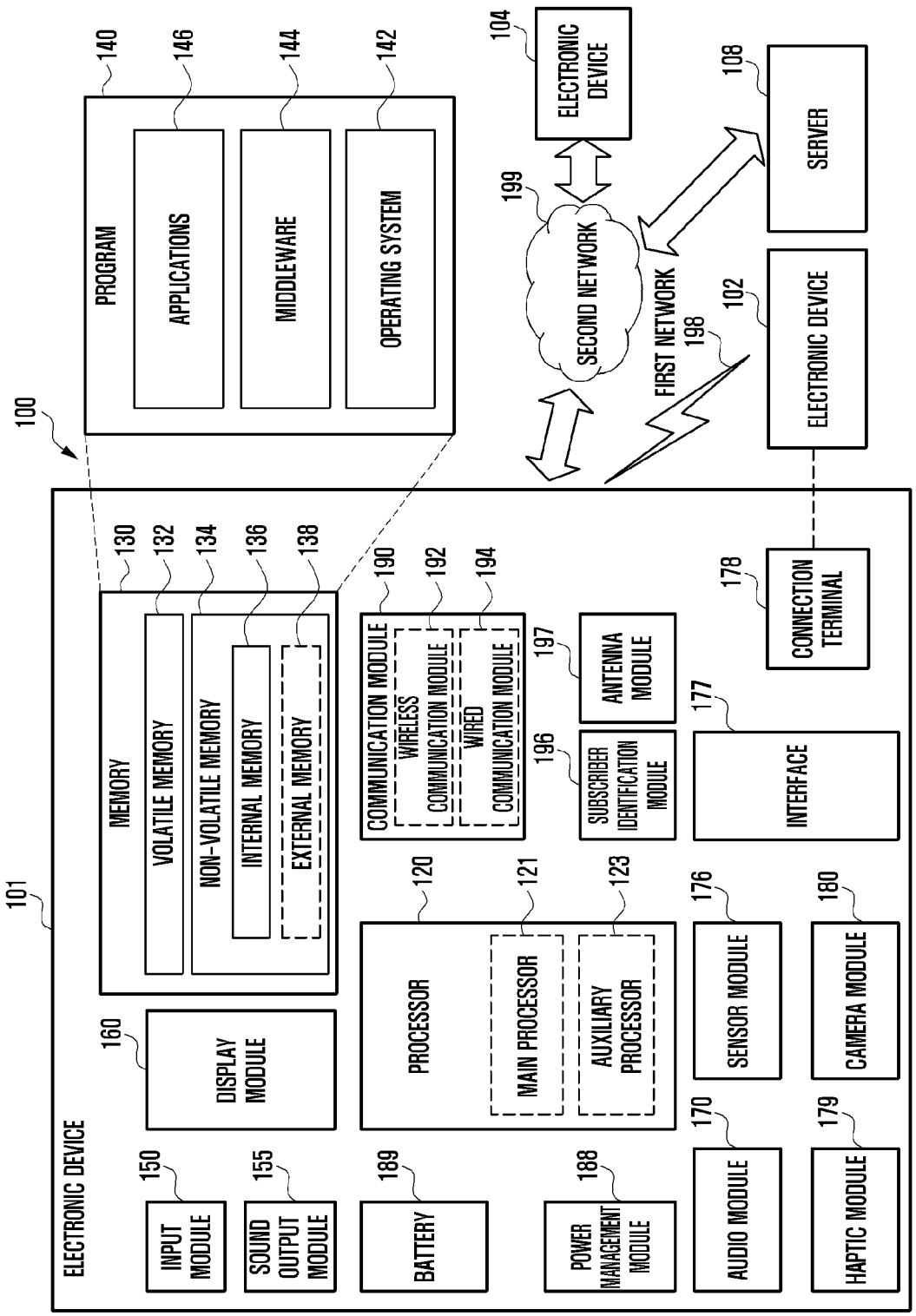
FIG. 1 is a block diagram of an embodiment of an electronic device in a network environment.

FIG. 1 is a block diagram illustrating an embodiment of an electronic device 101 in a network environment 100. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. In an embodiment, the electronic device may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module ("SIM") 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, e.g., software (e.g., a program 140) to control at least one other component (e.g., a hardware or software component) of the electronic device 101 coupled with the processor 120, and may perform various data processing or computation. In an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. In an embodiment, the processor 120 may include a main processor 121 (e.g., a central processing unit ("CPU") or an application processor ("AP")), or an auxiliary processor 123 (e.g., a graphics processing unit ("GPU"), a neural processing unit ("NPU"), an image signal processor ("ISP"), a sensor hub processor, or a communication processor ("CP")) that is operable independently from, or in conjunction with, the main processor 121. In an embodiment, when the electronic device 101 includes the main processor 121 and the auxiliary processor 123, the auxiliary processor 123 may be adapted to consume less power than the main processor 121, or to be predetermined to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include software (e.g., the program 140) and input data or output data for a command related thereto, for example. The memory 130 may include the volatile memory 132 or the non-volatile memory 134.

The program 140 may be stored in the memory 130 as software, and may include an operating system ("OS") 142, middleware 144, or an application 146, for example.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen), for example.

The sound output module 155 may output sound signals to the outside of the electronic device 101. The sound output module 155 may include a speaker or a receiver, for example. The speaker may be used for general purposes, such as playing multimedia or playing record. The receiver may be used for receiving incoming calls. In an embodiment, the receiver may be implemented as separate from, or as part of, the speaker.

The display module 160 may visually provide information to the outside (e.g., a user) of the electronic device 101. The display module 160 may include a display, a hologram device, or a projector and control circuitry to control a corresponding one of the display, hologram device, and projector, for example. In an embodiment, the display module 160 may include a touch sensor adapted to detect a touch, or a pressure sensor adapted to measure the intensity of force incurred by the touch.

The audio module 170 may convert a sound into an electrical signal and vice versa. In an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor, or an illuminance sensor, for example.

The interface 177 may support one or more specified protocols to be used for the electronic device 101 to be coupled with the external electronic device (e.g., the electronic device 102) directly (e.g., wiredly) or wirelessly. In an embodiment, the interface 177 may include a high definition multimedia interface ("HDMI"), a universal serial bus ("USB") interface, a secure digital ("SD") card interface, or an audio interface, for example.

A connection terminal 178 may include a connector via which the electronic device 101 may be physically connected with the external electronic device (e.g., the electronic device 102). In an embodiment, the connection terminal 178 may include a HDMI connector, a USB connector, a SD card connector, or an audio connector (e.g., a headphone connector), for example.

The haptic module 179 may convert an electrical signal into a mechanical stimulus (e.g., a vibration or a movement) or electrical stimulus which may be recognized by a user via tactile sensation or kinesthetic sensation of the user. In an embodiment, the haptic module 179 may include a motor, a piezoelectric element, or an electric stimulator, for example.

The camera module 180 may capture a still image or moving images. In an embodiment, the camera module 180 may include one or more lenses, image sensors, image signal processors, or flashes.

The power management module 188 may manage power supplied to the electronic device 101. In an embodiment, the power management module 188 may be implemented as at least part of, e.g., a power management integrated circuit ("PMIC").

The battery 189 may supply power to at least one component of the electronic device 101. In an embodiment, the battery 189 may include a primary cell which is not rechargeable, a secondary cell which is rechargeable, or a fuel cell, for example.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor ("AP")) and supports a direct (e.g., wired) communication or a wireless communication. In an embodiment, the communication module 190 may include a wireless communication module 192 (e.g., a cellular communication module, a short-range wireless communication module, or a global navigation satellite system ("GNSS") communication module) or a wired communication module 194 (e.g., a local area network ("LAN") communication module or a power line communication ("PLC") module). A corresponding one of these communication modules may communicate with the external electronic device via the first network 198 (e.g., a short-range communication network, such as Bluetooth™, wireless-fidelity ("Wi-Fi") direct, or IR data association ("IrDA")) or the second network 199 (e.g., a long-range communication network, such as a legacy cellular network, a fifth-generation ("5G") network, a next-generation communication network, the Internet, or a computer network (e.g., LAN or wide area network ("WAN")). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity ("IMSI")) stored in the SIM 196.

The wireless communication module 192 may support a 5G network, after a fourth-generation ("4G") network, and next-generation communication technology, e.g., new radio ("NR") access technology. The NR access technology may support enhanced mobile broadband ("eMBB"), massive machine type communications ("mMTC"), or ultra-reliable and low-latency communications ("URLLC"). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive "MIMO"), full dimensional MIMO ("FD-MIMO"), array antenna, analog beam-forming, or large scale antenna. The wireless communication module 192 may support various desirements specified in the electronic device 101, an external electronic device (e.g., the electronic device 104), or a network system (e.g., the second network 199). In an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink ("DL") and uplink ("UL"), or a round trip of 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element including a conductive material or a conductive pattern formed in or on a substrate (e.g., a printed circuit board ("PCB")). In an embodiment, the antenna module 197 may include a plurality of antennas (e.g., array antennas). In such a case, at least one antenna appropriate for a communication scheme used in the communication network, such as the first network 198 or the second network 199, may be selected, e.g., by the communication module 190 (e.g., the wireless communication module 192) from the plurality of antennas. The signal or the power may then be transmitted or received between the communication module 190 and the external electronic device via the selected at least one antenna. In an embodiment, another component (e.g., a radio frequency integrated circuit ("RFIC")) other than the radiating element may be additionally formed as part of the antenna module 197.

In an embodiment, the antenna module 197 may form a mmWave antenna module. In an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), or mobile industry processor interface ("MIPI")).

In an embodiment, commands or data may be transmitted or received between the electronic device 101 and the external electronic device 104 via the server 108 coupled with the second network 199. Each of the electronic devices 102 or 104 may be a device of a same type as, or a different type from the electronic device 101. In an embodiment, all or some of operations to be executed at the electronic device 101 may be executed at one or more of the external electronic devices 102, 104, or 108. In an embodiment, when the electronic device 101 is desired to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing ("MEC"), or client-server computing technology may be used, for example. The electronic device 101 may provide ultra-low-latency services using, e.g., distributed computing or mobile edge computing. In an embodiment, the external electronic device 104 may include an internet-of-things ("IoT") device. The server 108 may be an intelligent server using machine learning and/or a neural network. In an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
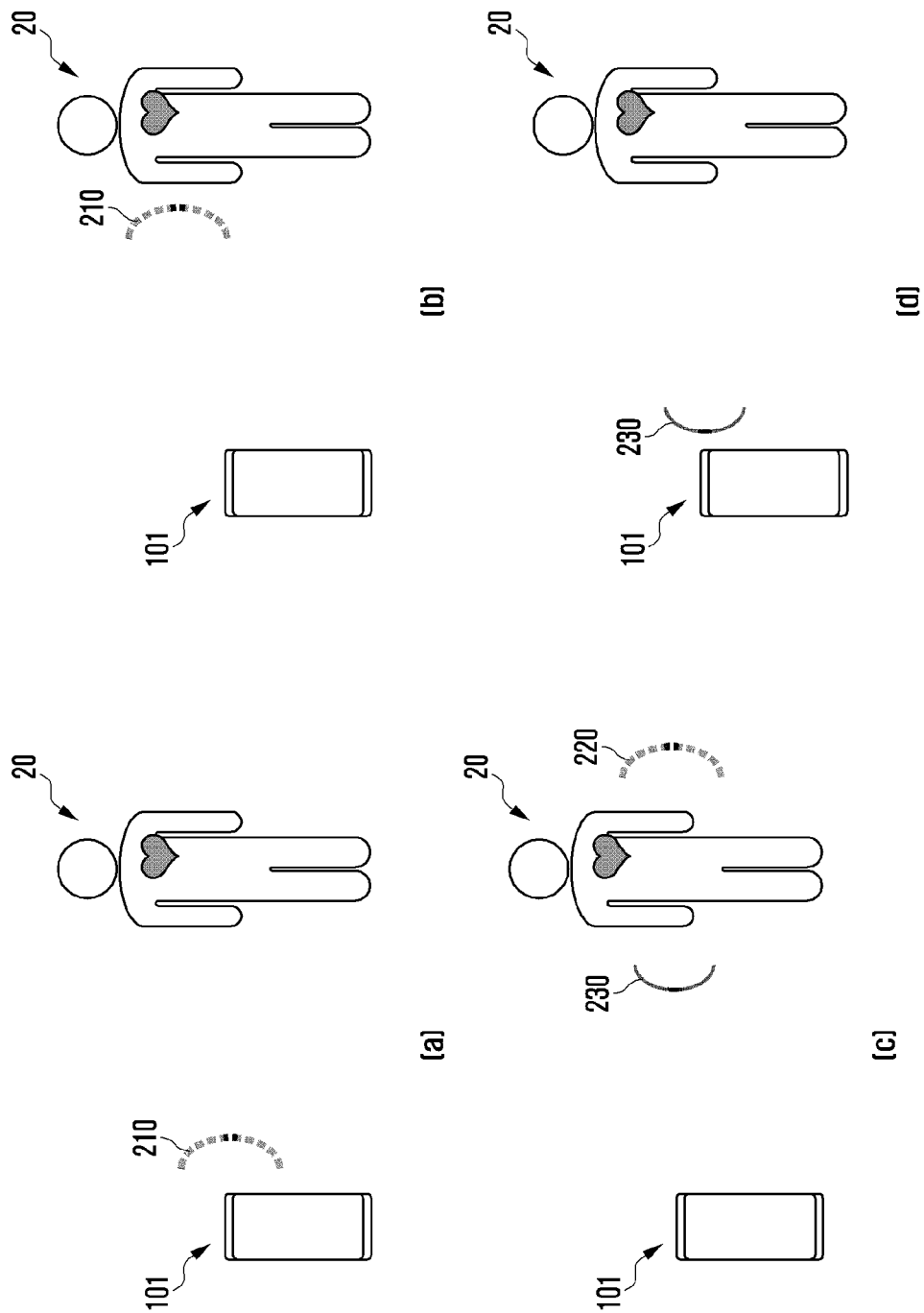
FIG. 2 shows an embodiment of a first function of an electronic device.

FIG. 2 shows an embodiment of a first function of an electronic device.

Referring to FIG. 2, an electronic device 101 (e.g., the electronic device 101 in FIG. 1) may perform a first function by a transmission signal 210 by wireless communication and a reception signal 230 by wireless communication. In an embodiment, wireless communication performed by the electronic device 101 may include ultra-wide band communication ("UWB" communication) (e.g., the second communication). The electronic device 101 may use the first function to determine a physical quantity including the position, direction, distance, and/or motion state (e.g., a movement speed or a movement direction) of an external object 20. The first function may be a radar function, for example.

In an embodiment, the electronic device 101 may emit the transmission signal to the outside. The electronic device 101 may include at least one antenna (e.g., a first antenna 550, a second antenna 570, and/or a third antenna 580 in FIG. 5). The electronic device 101 may use the at least one antenna to emit the transmission signal 210 to the outside. The electronic device 101 may emit the transmission signal 210 in multiple directions. In an embodiment, the electronic device 101 may emit the transmission signal in substantially all directions around the electronic device 101. In an embodiment, the electronic device 101 may emit a substantially non-directional transmission signal 210 in order to perform the first function. In an embodiment, the electronic device 101 may divide an angle in substantially all directions around the electronic device 101, that is, on a three-dimensional ("3D") coordinate system, to emit temporally and/or spatially the transmission signal 210. In an embodiment, in view of emission characteristics, the electronic device 101 may emit, when performing the first function, the transmission signal 210 by a laser direct structuring antenna ("LDS" antenna) and/or a metal antenna.

In an embodiment, the electronic device 101 may receive the reception signal 230 from the outside. The reception signal 230 may be a signal when the transmission signal emitted from the electronic device 101 is reflected by the object 20 and reaches the electronic device 101 again. When hitting the object 20, the transmission signal 210 may be divided into a partial signal 220, which passes through the object 20 or is scattered or eliminated by the object 20, and the reception signal (also referred to as a reflected transmission signal) 230, which is reflected by the object 20. The reception signal 230 may be reflected by the object 20 and may reach the electronic device 101.

In an embodiment, the electronic device 101 may determines, based on the reception signal 230, the physical quantity of the object 20 including the position, direction, distance, and/or motion state (e.g., a movement speed or a movement direction) of the object 20. A signal reflected by the object 20 (e.g., the reception signal 230) may be used to determine a distance from the electronic device 101 to the object 20, an angle, and a time, based on a time taken to emit the transmission signal 210 and then receive the corresponding reception signal 230, an angle, or a frequency of the reception signal 230 according to the position, the direction, the distance, and/or the motion state (e.g., the movement speed or movement direction) of the object 20.

In an embodiment, the electronic device 101 may receive the reception signal 230 while emitting the transmission signal 210. In an embodiment, the electronic device 101 may simultaneously use an antenna (e.g., a first antenna) for emitting the transmission signal 210 and an antenna (e.g., a second antenna) for receiving the reception signal 230 to receive the reception signal 230 while emitting the transmission signal 210.

Figure 3:
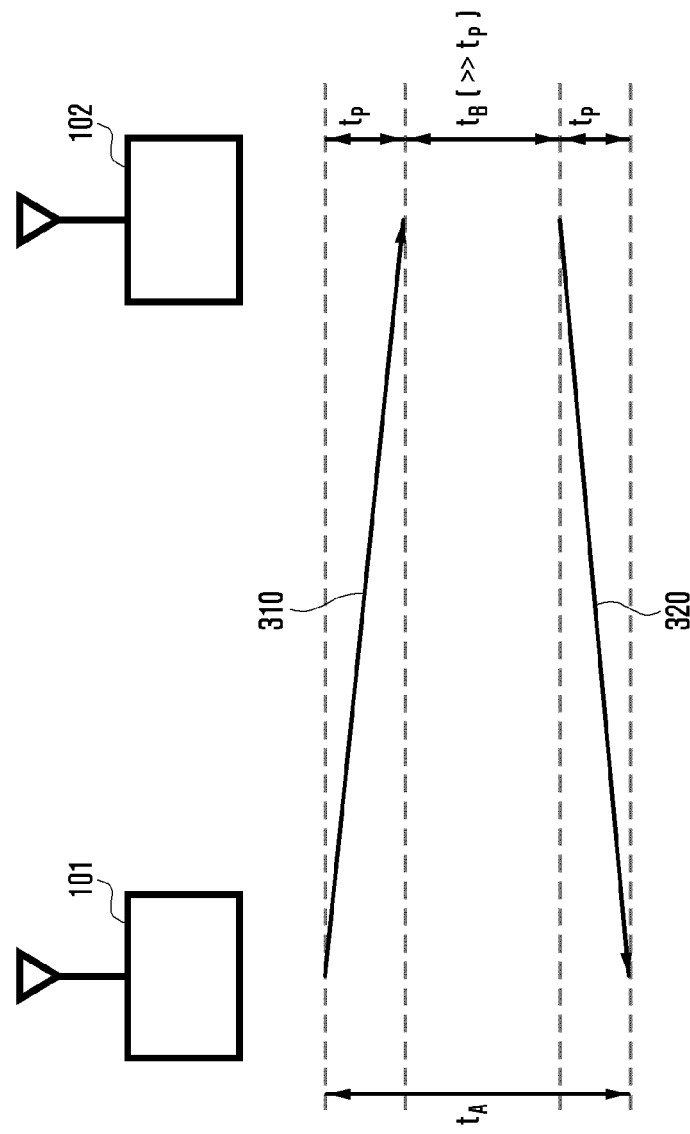
FIG. 3 shows an embodiment of a second function of an electronic device.

FIG. 3 shows an embodiment of a second function of an electronic device.

Referring to FIG. 3, an electronic device 101 (e.g., the electronic device 101 in FIG. 1) may perform a second function by a transmission signal 310 through wireless communication and a reception signal 320 through wireless communication. In an embodiment, wireless communication performed by the electronic device 101 may include UWB communication (e.g., second communication). The electronic device 101 may use the second function to determine the distance between an external electronic device 102 and the electronic device 101. The second function may be a ranging function, for example.

In an embodiment, the electronic device 101 may emit the transmission signal to the outside. The electronic device 101 may include at least one antenna (e.g., the first antenna 550, the second antenna 570 and/or the third antenna 580 in FIG. 5). The electronic device 101 may use the at least one antenna to emit the transmission signal 310 to the outside. The electronic device 101 may emit the transmission signal 310 in multiple directions. In an embodiment, the electronic device 101 may emit the transmission signal in substantially all directions around the electronic device 101. In an embodiment, the electronic device 101 may emit a substantially non-directional transmission signal 310 in order to perform the second function. In an embodiment, the electronic device 101 may divide an angle in substantially all directions around the electronic device 101, that is, on a 3D coordinate system, to emit temporally and/or spatially the transmission signal 310. In an embodiment, in view of emission characteristics, when performing the second function, the electronic device 101 may use an LDS antenna and/or a metal antenna to emit the transmission signal 310. In an embodiment, the transmission signal 310 may include a signal which requests the external electronic device 102 having received the transmission signal 310 to transmit the reception signal 320. The external electronic device 102 may receive the transmission signal 310, and may emit the reception signal toward the electronic device 101. In an embodiment, the external electronic device may transmit the reception signal 320 after a predetermined time (e.g., a response wait time $t_B$) elapses immediately after reception of the transmission signal 310. The electronic device 101 may pre-store information about the response wait time $t_B$. The reception signal 320 may include the information about the response wait time $t_B$ of the external electronic device 102.

In an embodiment, the electronic device 101 may receive the reception signal 320 from the outside. The reception signal 320 may be a signal which, after the external electronic device 102 receives the transmission signal 310 emitted from the electronic device 101, the external electronic device 102 having received the transmission signal 310 transmits toward the electronic device 101.

In an embodiment, the electronic device 101 may perform the second function of measuring, based on a time (e.g., a round trip time $t_A$) desired to emit the transmission signal 310 and receive the reception signal 320 again, a distance by which the external electronic device 102 is spaced apart from the electronic device 101. Referring to FIG. 3, the electronic device 101 may measure the round trip time $t_A$, based on the transmission signal 310 and the reception signal 320, and may determine, based on the round trip time $t_A$, a time (e.g., a movement time $t_p$) taken for a signal to move. In an embodiment, the movement time $t_p$ may be remarkably shorter than the response wait time $t_B$, and the electronic device 101 may calculate the movement time $t_p$ by dividing the time difference between the round trip time $t_A$ and the response wait time $t_B$ by 2. In an embodiment, the electronic device 101 may determine a distance of the external electronic device 102 therefrom by dividing the movement time $t_p$ by the movement speed of the transmission signal 310 and/or the reception signal 320 (e.g., the speed of light).

In this case, there is a time difference (e.g., the round trip time $t_A$) between the transmission of the transmission signal 310 and the reception of the reception signal 320, and thus the electronic device 101 may use an identical antenna to perform the second function. In an embodiment, the first antenna may be used to transmit the transmission signal 310, and the identical first antenna may be used to receive the reception signal 320.

Figure 4:
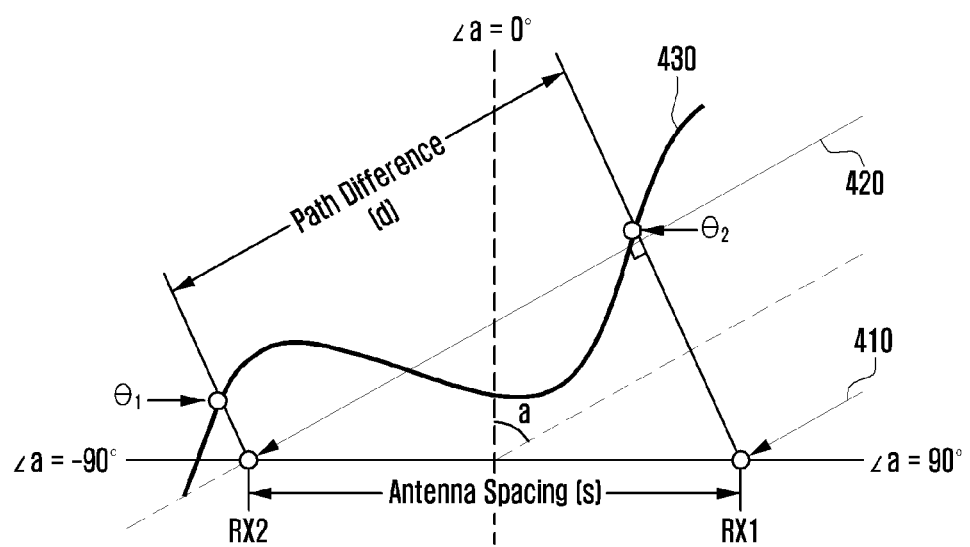
FIG. 4 shows an embodiment of a third function of an electronic device.

FIG. 4 shows an embodiment of a third function of an electronic device.

Referring to FIG. 4, an electronic device 101 (e.g., the electronic device 101 in FIG. 1) may perform a third function by a reception signal by wireless communication. In an embodiment, the electronic device 101 may include multiple antennas (e.g., a first antenna RX1 and a second antenna RX2), and may determine a path difference of a reception signal reaching the respective antennas. In an embodiment, wireless communication performed by the electronic device 101 may include UWB communication (e.g., the second communication). The electronic device 101 may use the third function to determine a physical quantity including the angle of arrival ("AoA") (angle a) of an external signal.

In an embodiment, the electronic device 101 may use at least two antennas (e.g., the first antenna RX1 and the second antenna RX2) to receive a signal reaching from the outside. The electronic device 101 may simultaneously receive a reception signal from the at least two antennas (e.g., the first antenna RX1 and the second antenna RX2). The reception signal may reach the first antenna RX1 through a first path 410, and may reach the second antenna RX2 through a second path 420. In an embodiment, the electronic device 101 may determine a path difference 430 up to the first antenna RX1 and the second antenna RX2 with respect to the reception signal. The path difference 430 may have a length of d, and may form a phase difference θ of "θ1-θ2" by means of a first phase θ2, which is a phase of a reception signal corresponding to the first antenna RX1, and a second phase θ1, which is a phase of a reception signal corresponding to the second antenna RX2.

In an embodiment, the electronic device 101 may estimate an AoA (angle a), based on phase information (e.g., the first phase θ2) when receiving a reception signal through the first antenna RX1, phase information (e.g., the second phase θ1) when receiving the reception signal through the second antenna RX2, length information d of the path difference 430, the distance S between the first antenna RX1 and the second antenna RX2, and a width λ of the reception signal. The electronic device 101 may estimate the AoA (angle a) through a mathematical expression, e.g., Equation 1 below.

$$a = \arcsin\left(\frac{\lambda\theta}{2\pi S}\right) \quad \text{[Equation 1]}$$

Figure 5:
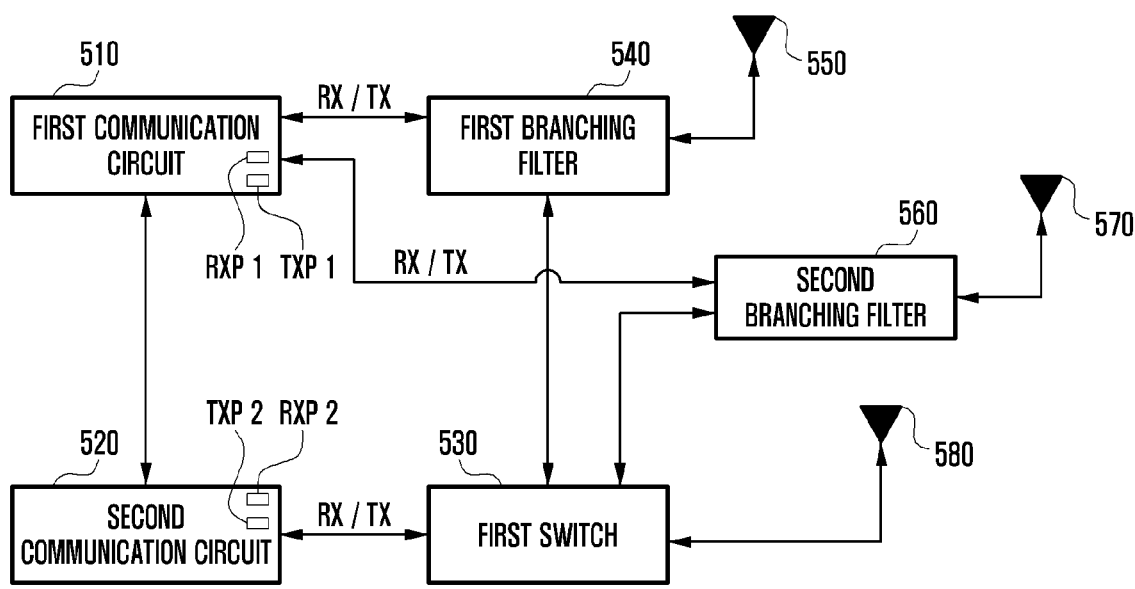
FIG. 5 is a block diagram illustrating an embodiment of communication circuits of an electronic device.

FIG. 5 is a block diagram illustrating an embodiment of communication circuits of an electronic device.

Referring to FIG. 5, an electronic device (e.g., the electronic device 101 in FIG. 1) an embodiment of the invention may include a first communication circuit 510, a second communication circuit 520, a first switch 530, a first branching filter 540, a first antenna 550, a second branching filter 560, a second antenna 570, and a third antenna 580.

In an embodiment, the electronic device 101 may include various elements (e.g., a front-end module, an amplifier, a switch, or a splitter) for receiving a signal through first communication or transmitting a signal through the first communication. The first communication may imply one of various types of wireless communication supported by the electronic device 101. In an embodiment, the first communication may include wireless fidelity ("WiFi") and/or Bluetooth communication supported by the electronic device 101. The electronic device 101 may use the first communication circuit 510 to control transmitting a signal through the first communication or receiving a signal through the first communication. In an embodiment, the first communication circuit 510 may include at least one reception port (e.g., a first reception port RXP1) for receiving a reception signal (e.g., RX) of the first communication and at least one transmission port (e.g., a first transmission port TXP1) for outputting a transmission signal (e.g., TX) of the first communication.

In an embodiment, the electronic device 101 may include various elements (e.g., an amplifier, a switch, or a splitter) for receiving a signal through second communication or transmitting a signal through the second communication. The second communication may imply one of various types of wireless communication supported by the electronic device 101. In an embodiment, the second communication may include UWB communication supported by the electronic device 101. The electronic device 101 may use the second communication circuit 520 to control transmitting a signal through the second communication or receiving a signal through the second communication. In an embodiment, the second communication circuit 520 may include at least one reception port (e.g., a second reception port RXP2) for receiving a reception signal (e.g., RX) of the second communication and at least one transmission port (e.g., a second transmission port TXP2) for outputting a transmission signal (e.g., TX) of the second communication.

In an embodiment of the invention, a frequency band of the first communication and a frequency band of the second communication may at least partially overlap each other. In an embodiment, the frequency band of the first communication may include a frequency band of 2.4 gigahertz (GHz) to 2.5 GHz and/or a frequency band of 5.15 GHz to 7.125 GHz. In an embodiment, when the second communication is a UWB, the frequency band of the second communication may include a frequency band of 6.25 GHz to 6.75 GHz (e.g., a first frequency band) and/or a frequency band of 7.75 GHz to 8.25 GHz (e.g., a second frequency band). Therefore, the frequency band of the first communication and the frequency band of the second communication may overlap each other in the first frequency band (e.g., 6.25 GHz to 6.75 GHz).

In an embodiment, the first antenna 550 may receive a signal transmitted by an external electronic device, or may transmit a signal to the outside of the electronic device 101. The first antenna 550 may receive or output a signal of the frequency band (e.g., 2.4 GHz to 2.5 GHz and 5.15 GHz to 7.125 GHz) of the first communication and a signal of the frequency band (e.g., the first frequency band and/or the second frequency band) of the second communication. The first antenna 550 may receive or output a signal of a frequency band (e.g., 2.4 GHz to 2.5 GHz and/or 5.15 GHz to 8.25 GHz) having a range which includes the frequency band of the first communication and the frequency band of the second communication.

In an embodiment, the second antenna 570 may receive a signal transmitted by an external electronic device, or may transmit a signal to the outside of the electronic device 101. The second antenna 570 may receive or output a signal of the frequency band (e.g., 2.4 GHz to 2.5 GHz and 5.15 GHz to 7.125 GHz) of the first communication and a signal of the frequency band (e.g., the first frequency band and/or the second frequency band) of the second communication. The second antenna 570 may receive or output a signal of a frequency band (e.g., 2.4 GHz to 2.5 GHz and/or 5.15 GHz to 8.25 GHz) having a range which includes the frequency band of the first communication and the frequency band of the second communication.

In an embodiment, the third antenna 580 may receive a signal transmitted by an external electronic device, or may transmit a signal to the outside of the electronic device 101. The third antenna 580 may receive or output a signal of the frequency band (e.g., the first frequency band and/or the second frequency band) of the second communication. The third antenna 580 may receive or output a signal of a frequency band (e.g., 6.25 GHz to 8.25 GHz) having a range which includes the frequency band of the second communication.

In an embodiment, the first branching filter 540 may filter, based on a frequency band, a signal received by the first antenna 550. In an embodiment, the first branching filter 540 may transfer a signal of the frequency band of the first communication, among signals received from the first antenna 550, to the first communication circuit 510. In an embodiment, the first branching filter 540 may transfer, to the first switch 530, a signal of at least a partial band (e.g., the second frequency band) of the frequency band of the second communication, among the received signals. In an embodiment, the first branching filter 540 may include a triplexer. The first branching filter 540 may include, without being limited to the triplexer, various branching filter elements, such as a diplexer and a quadplexer, branching into multiple paths. When the first branching filter 540 includes the triplexer, the first branching filter 540 may separate signals of the first communication, among signals received from the first antenna 550, into at least two frequency bands (e.g., a frequency band of 2.4 GHz to 2.5 GHz and a frequency band of 5.15 GHz to 7.125 GHz) and transfer the signals to the first communication circuit 510, and may transfer, to the first switch 530, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 510, may be transferred to the first communication circuit 510 through different front-end modules, respectively.

In an embodiment, the second branching filter 560 may filter, based on a frequency band, a signal received by the second antenna 570. In an embodiment, the second branching filter 560 may transfer a signal of the frequency band of the first communication, among signals received from the second antenna 570, to the first communication circuit 510. In an embodiment, the second branching filter 560 may transfer, to the first switch 530, a signal of at least a partial band (e.g., the second frequency band) of the frequency band of the second communication, among the received signals. In an embodiment, the second branching filter 560 may include a triplexer. The second branching filter 560 may include, without being limited to the triplexer, various branching filter elements, such as a diplexer and a quadplexer, branching into multiple paths. When the second branching filter 560 includes the triplexer, the second branching filter 560 may separate signals of the first communication, among signals received from the second antenna 570, into at least two frequency bands (e.g., a frequency band of 2.4 GHz to 2.5 GHz and a frequency band of 5.15 GHz to 7.125 GHz) and transfer the signals to the first communication circuit 510, and may transfer, to the first switch 530, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 510, may be transferred to the first communication circuit 510 through different front-end modules, respectively.

In an embodiment, the first switch 530 may be connected to the second communication circuit 520 to switch between the first branching filter 540, the second branching filter 560, and the third antenna 580. In an embodiment, the first switch 530 may be implemented as a switch which includes multiple poles connected to at least one of a reception port of the second communication circuit 520 and a transmission port of the second communication circuit 520, and multiple output terminals (throws) connected to at least one among the first branching filter 540, the second branching filter 560, and/or the third antenna 580. In an embodiment, the first switch 530 in FIG. 5 may include a double pole three throw ("DP3T"). In an embodiment, the second communication circuit may control the first switch 530 in consideration of a frequency band of a reception signal of the second communication or a frequency band of a transmission signal of the second communication.

In an embodiment, the second communication circuit 520 may transmit, to the first communication circuit 510, a signal requesting for receiving a reception signal through the second communication. The second communication circuit 520 may control the first switch 530 to receive a reception signal of the second communication through the first antenna 550 and/or the second antenna 570.

In an embodiment, the second communication circuit 520 may transmit, to the first communication circuit 510, a signal requesting for transmitting a transmission signal through the second communication. The second communication circuit 520 may control the first switch 530 to transmit a transmission signal of the second communication through the first antenna 550 and/or the second antenna 570.

In an embodiment, the second communication circuit 520 may control the first switch 530 to perform a first function (e.g., the first function in FIG. 2), a second function (e.g., the second function in FIG. 3), and/or a third function (e.g., the third function in FIG. 4).

In an embodiment, in order to perform the first function, the second communication circuit 520 may simultaneously use the first antenna 550 and the second antenna 570 to transmit and receive a second communication signal. In an embodiment, the second communication circuit 520 may control the first switch 530 so as to be connected to the first branching filter 540 and the second branching filter 560, thereby simultaneously transmitting and receiving signals through the second communication. In an embodiment, the second communication circuit 520 may use one of the first antenna and the second antenna 570 to transmit a transmission signal through the second communication, and may use the other to receive a reception signal through the second communication.

In an embodiment, in order to perform the second function, the second communication circuit 520 may use at least one of the first antenna 550 and the second antenna 570 to transmit and receive signals through the second communication. In an embodiment, the second communication circuit 520 may control the first switch 530 so as to be connected to the first branching filter 540 and/or the second branching filter 560, thereby transmitting and receiving signals through the second communication by the first antenna 550 and/or the second antenna 570. In an embodiment, the second communication circuit 520 may use one of the first antenna 550 and the second antenna to transmit a transmission signal through the second communication, and may use the identical antenna to receive a reception signal through the second communication. In another embodiment, the second communication circuit 520 may use one of the first antenna 550 and the second antenna 570 to transmit a transmission signal through the second communication, and may use the other antenna to receive a reception signal through the second communication.

In an embodiment, in order to perform the third function, the second communication circuit 520 may use the third antenna 580 to receive a signal through the second communication. In an embodiment, the second communication circuit 520 may control the first switch 530 so as to be connected to the third antenna 580, thereby receiving a signal through the second communication by the third antenna 580.

Figure 6:
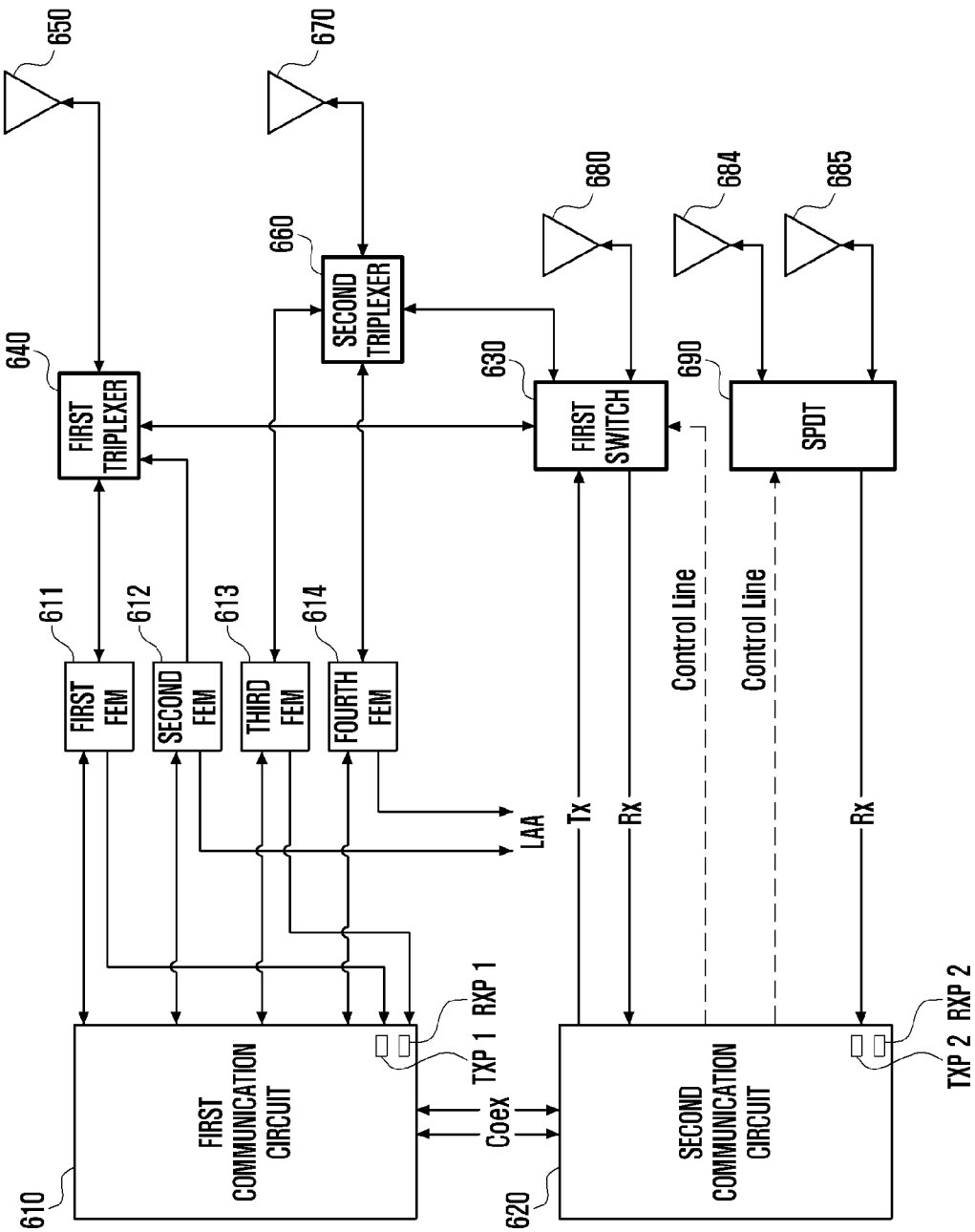
FIG. 6 is a block diagram illustrating an embodiment of communication circuits of an electronic device.

FIG. 6 is a block diagram illustrating an embodiment of communication circuits of an electronic device.

Referring to FIG. 6, the communication circuits in FIG. 6 may be obtained by specifying the communication circuits in FIG. 5. In an embodiment, the block diagram in FIG. 6 may include elements of the communication circuits, which are not illustrated in FIG. 5, or elements added in FIG. 5.

Referring to FIG. 6, an embodiment of an electronic device (e.g., the electronic device 101 in FIG. 1) according to the invention may include a first communication circuit (e.g., the first communication circuit 510 in FIG. 5), multiple front-end modules ("FEMs") 611, 612, 613 and/or 614, a second communication circuit 620 (e.g., the second communication circuit 520 in FIG. 5), a first switch 630 (e.g., the first switch 530 in FIG. 5), a first triplexer 640 (e.g., the first branching filter 540 in FIG. 5), a first antenna 650 (e.g., the first antenna 550 in FIG. 5), a second triplexer 660 (e.g., the second branching filter 560 in FIG. 5), a second antenna 670 (e.g., the second antenna 570 in FIG. 5), a third antenna 680 (e.g., the third antenna 580 in FIG. 5), a fourth antenna 684, a fifth antenna 685, and a single pole double throw ("SPDT") switch 690.

Referring to FIG. 6, the electronic device 101 may include various elements (e.g., a front-end module, an amplifier, a switch, or a splitter) for receiving a signal through first communication or transmitting a signal through the first communication. The first communication may imply one of various types of wireless communication supported by the electronic device 101. In an embodiment, the first communication may include WiFi and/or Bluetooth communication supported by the electronic device 101. The electronic device 101 may use the first communication circuit 610 to control transmitting a signal through the first communication or receiving a signal through the first communication. In an embodiment, the first communication circuit 610 may include at least one reception port (e.g., a first reception port RXP1) for receiving a reception signal (e.g., RX) of the first communication and at least one transmission port (e.g., a first transmission port TXP1) for outputting a transmission signal (e.g., TX) of the first communication.

In an embodiment, the electronic device 101 may include the FEMs (e.g., a first FEM 611, a second FEM 612, a third FEM 613, and a fourth FEM 614) in order to receive or transmit a signal through the first communication.

In an embodiment of the invention, the first FEM 611 may transmit, to the first communication circuit 610, a reception signal of first communication that is obtained by amplifying a signal received through the first antenna 650 or removing noise of the received signal. The first FEM 611 may perform processing of amplifying a transmission signal of the first communication, transmitted by the first communication circuit 610, or removing noise. The processed signal may be output through the first antenna 650 via the first triplexer 640. A frequency band of a signal received or output by the first FEM 611 may be a partial frequency band (e.g., 2.4 GHz to 2.5 GHz) in a frequency band of the first communication.

In an embodiment of the invention, the second FEM 612 may transmit, to the first communication circuit 610, a reception signal of first communication that is obtained by amplifying a signal received through the first antenna 650 or removing noise of the received signal. The second FEM 612 may perform processing of amplifying a transmission signal of the first communication, transmitted by the first communication circuit 610, or removing noise. The processed signal may be output through the first antenna 650 via the first triplexer 640. A frequency band of a signal received or output by the second FEM 612 may be a partial frequency band (e.g., 5.15 GHz to 7.125 GHz) in the frequency band of the first communication. The frequency band (e.g., 5.15 GHz to 7.125 GHz) of a signal received or output by the second FEM 612 may include a frequency band (e.g., the first frequency band (a frequency of 6.25 GHz to 6.75 GHz)) which overlaps at least a part of that of a signal by second communication. In an embodiment, the second FEM 612 may be connected with a license assisted access ("LAA") part which process signal according to LTE-LAA technology. LTE-LAA is a standard technology for operating LTE system using unlicensed frequency band (e.g., 5 GHz ISM (industrial, scientific and medical)). The frequency band used in LTE-LAA may be included in the frequency band of first communication (e.g., 5.15 GHz to 7.125 GHz). For example, signal output from a LTE base station may be received by the first antenna 650. The received signal may be transmitted to the second FEM 612 via the first triplexer 640, and signal processed by the second FEM 612 may be output to the LAA part. The signal output from the LAA part may be amplified by the second FEM 612 and output by the first antenna 650, via the first triplexer 640, to external space. The first antenna 650 may transmit or receive LAA signal while not using the first communication (e.g., WiFi, Bluetooth).

In an embodiment of the invention, the third FEM 613 may transmit, to the first communication circuit 610, a reception signal of first communication that is obtained by amplifying a signal received through the second antenna 670 or removing noise of the received signal. The third FEM 613 may perform processing of amplifying a transmission signal of the first communication, transmitted by the first communication circuit 610, or removing noise. The processed signal may be output through the second antenna 670 via the second triplexer 660. A frequency band of a signal received or output by the third FEM 613 may be a partial frequency band (e.g., 2.4 GHz to 2.5 GHz) in a frequency band of the first communication.

In an embodiment of the invention, the fourth FEM 614 may transmit, to the first communication circuit 610, a reception signal of first communication that is obtained by amplifying a signal received through the second antenna 670 or removing noise of the received signal. The fourth FEM 614 may perform processing of amplifying a transmission signal of the first communication, transmitted by the first communication circuit 610, or removing noise. The processed signal may be output through the second antenna 670 via the second triplexer 660. A frequency band of a signal received or output by the fourth FEM 614 may be a partial frequency band (e.g., 5.15 GHz to 7.125 GHz) in the frequency band of the first communication. The frequency band (e.g., 5.15 GHz to 7.125 GHz) of a signal received or output by the fourth FEM 614 may include a frequency band (e.g., the first frequency band (a frequency of 6.25 GHz to 6.75 GHz)) which overlaps at least a part of that of a signal by second communication. In an embodiment, the fourth FEM 614 may be connected with the LAA part. For example, signal output from a LTE base station may be received by the second antenna 670. The received signal may be transmitted to the fourth FEM 614 via the second triplexer 660, and signal processed by the fourth FEM 614 may be output to the LAA part. The second antenna 670 may transmit or receive LAA signal while not using the first communication (e.g., WiFi, Bluetooth).

In an embodiment, the electronic device 101 may include various elements (e.g., an amplifier, a switch, or a splitter) for receiving a signal through second communication or transmitting a signal through the second communication. The second communication may imply one of various types of wireless communication supported by the electronic device 101. In an embodiment, the second communication may include UWB communication supported by the electronic device 101. The electronic device 101 may use the second communication circuit 620 to control transmitting a signal through the second communication or receiving a signal through the second communication. In an embodiment, the second communication circuit 620 may include at least one reception port (e.g., the second reception port RXP2) for receiving a reception signal (e.g., RX) of the second communication and at least one transmission port (e.g., the second transmission port TXP2) for outputting a transmission signal (e.g., TX) of the second communication.

In an embodiment of the invention, a frequency band of the first communication and a frequency band of the second communication may at least partially overlap each other. In an embodiment, the frequency band of the first communication may include a frequency band of 2.4 GHz to 2.5 GHz and/or a frequency band of 5.15 GHz to 7.125 GHz. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the first communication and the frequency band of the second communication may overlap each other in the first frequency band (e.g., 6.25 GHz to 6.75 GHz).

In an embodiment, the first antenna 650 may receive a signal transmitted by an external electronic device, or may transmit a signal to the outside of the electronic device 101. The first antenna 650 may receive or output a signal of the frequency band (e.g., 2.4 GHz to 2.5 GHz and 5.15 GHz to 7.25 GHz) of the first communication and a signal of the frequency band (e.g., the first frequency band and/or the second frequency band) of the second communication. The first antenna 650 may receive or output a signal of a frequency band (e.g., 2.4 GHz to 2.5 GHz and/or 5.15 GHz to 8.25 GHz) having a range which includes the frequency band of the first communication and the frequency band of the second communication. In an embodiment, the first antenna 650 may include an LDS antenna and/or a metal antenna.

In an embodiment, the second antenna 670 may receive a signal transmitted by an external electronic device, or may transmit a signal to the outside of the electronic device 101. The second antenna 670 may receive or output a signal of the frequency band (e.g., 2.4 GHz to 2.5 GHz and 5.15 GHz to 7.125 GHz) of the first communication and a signal of the frequency band (e.g., the first frequency band and/or the second frequency band) of the second communication. The second antenna 670 may receive or output a signal of a frequency band (e.g., 2.4 GHz to 2.5 GHz and/or 5.15 GHz to 8.25 GHz) having a range which includes the frequency band of the first communication and the frequency band of the second communication. In an embodiment, the second antenna 670 may include an LDS antenna and/or a metal antenna.

In an embodiment, the third antenna 680 may receive a signal transmitted by an external electronic device, or may transmit a signal to the outside of the electronic device 101. The third antenna 680 may receive or output a signal of the frequency band (e.g., the first frequency band and/or the second frequency band) of the second communication. The third antenna 680 may receive or output a signal of a frequency band (e.g., 6.25 GHz to 8.25 GHz) having a range which includes the frequency band of the second communication. In an embodiment, the third antenna 680 may include a patch antenna.

In an embodiment, the fourth antenna 684 may receive a signal transmitted by an external electronic device, or may transmit a signal to the outside of the electronic device 101. The fourth antenna 684 may receive or output a signal of the frequency band (e.g., the first frequency band and/or the second frequency band) of the second communication. The fourth antenna 684 may receive or output a signal of a frequency band (e.g., 6.25 GHz to 8.25 GHz) having a range which includes the frequency band of the second communication. In an embodiment, the fourth antenna 684 may include a patch antenna.

In an embodiment, the fifth antenna 685 may receive a signal transmitted by an external electronic device, or may transmit a signal to the outside of the electronic device 101. The fifth antenna 685 may receive or output a signal of the frequency band (e.g., the first frequency band and/or the second frequency band) of the second communication. The fifth antenna 685 may receive or output a signal of a frequency band (e.g., 6.25 GHz to 8.25 GHz) having a range which includes the frequency band of the second communication. In an embodiment, the fifth antenna 685 may include a patch antenna.

In an embodiment, the first triplexer 640 may filter, based on a frequency band, a signal received by the first antenna 650. In an embodiment, the first triplexer 640 may transfer a signal of the frequency band of the first communication, among signals received from the first antenna 650, to the first communication circuit 610. In an embodiment, the first triplexer 640 may transfer, to the first switch 630, a signal of at least a partial band (e.g., the second frequency band) of the frequency band of the second communication, among the received signals. In an embodiment, the first triplexer 640 may separate signals of the first communication, among signals received from the first antenna 650, into at least two frequency bands (e.g., a frequency band of 2.4 GHz to 2.5 GHz and a frequency band of 5.15 GHz to 7.125 GHz) and transfer the signals to the first communication circuit 610, and may transfer, to the first switch 630, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 610, may be transferred to the first communication circuit 610 through different front-end modules (e.g., the first FEM 611 or the second FEM 612), respectively. In an embodiment, the first triplexer 640 may transfer a signal of the second frequency band (e.g., a signal through the second communication including a frequency band of 7.75 GHz to 8.25 GHz) to the first switch 630, may transfer a signal having a frequency band overlapping that of the second communication (e.g., a first communication signal of the 5.15 GHz to 7.125 GHz band), among signals of the first communication, to the second FEM 612, and may transfer, to the first FEM 611, a signal having a frequency band which does not overlap that of the second communication (e.g., a first communication signal of the 2.4 GHz to 2.5 GHz band), among signals of the first communication.

In an embodiment, the second triplexer 660 may filter, based on a frequency band, a signal received by the second antenna 670. In an embodiment, the second triplexer may transfer a signal of the frequency band of the first communication, among signals received from the second antenna 670, to the first communication circuit 610. In an embodiment, the second triplexer 660 may transfer, to the first switch 630, a signal of at least a partial band (e.g., the second frequency band) of the frequency band of the second communication, among the received signals. In an embodiment, the second triplexer 660 may separate signals of the first communication, among signals received from the second antenna 670, into at least two frequency bands (e.g., a frequency band of 2.4 GHz to 2.5 GHz and a frequency band of 5.15 GHz to 7.125 GHz) and transfer the signals to the first communication circuit 610, and may transfer, to the first switch 630, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 610, may be transferred to the first communication circuit 610 through different front-end modules (e.g., the third FEM 613 or the fourth FEM 614), respectively. In an embodiment, the second triplexer 660 may transfer a signal of the second frequency band (e.g., a signal through the second communication including a frequency band of 7.75 GHz to 8.25 GHz) to the first switch 630, may transfer a signal having a frequency band overlapping that of the second communication (e.g., a first communication signal of the 5.15 GHz to 7.125 GHz band), among signals of the first communication, to the fourth FEM 614, and may transfer, to the third FEM 613, a signal having a frequency band which does not overlap that of the second communication (e.g., a first communication signal of the 2.4 GHz to 2.5 GHz band), among signals of the first communication.

In an embodiment, the first switch 630 may be connected to the second communication circuit 620 to switch between the first triplexer 640, the second triplexer 660, and the third antenna 680. In an embodiment, the first switch 630 may be implemented as a switch which includes multiple poles connected to at least one of a reception port of the second communication circuit 620 and a transmission port of the second communication circuit 620, and multiple output terminals (throws) connected to at least one among the first triplexer 640, the second triplexer 660, and/or the third antenna 680. In an embodiment, the first switch 630 in FIG. 6 may include a DP3T. In an embodiment, the second communication circuit may control the first switch 630 in consideration of a frequency band of a reception signal of the second communication or a frequency band of a transmission signal of the second communication.

In an embodiment, the second communication circuit 620 may transmit, to the first communication circuit 610, a signal requesting for receiving a reception signal through the second communication. In an embodiment, signals may be transmitted between the first communication circuit 610 and the second communication circuit 620 via the coexistence ("Coex") interface, but is not limited thereto. The second communication circuit 620 may control the first switch 630 to receive a reception signal of the second communication through the first antenna 650 and/or the second antenna 670.

In an embodiment, the second communication circuit 620 may transmit, to the first communication circuit 610, a signal requesting for transmitting a transmission signal through the second communication. The second communication circuit 620 may control the first switch 630 to transmit a transmission signal of the second communication through the first antenna 650 and/or the second antenna 670.

In an embodiment, the second communication circuit 620 may control the first switch 630 to perform a first function (e.g., the first function in FIG. 2), a second function (e.g., the second function in FIG. 3), and/or a third function (e.g., the third function in FIG. 4).

In an embodiment, in order to perform the first function, the second communication circuit 620 may simultaneously use the first antenna 650 and the second antenna 670 to transmit and receive a second communication signal. In an embodiment, the second communication circuit 620 may control the first switch 630 so as to be connected to the first triplexer 640 and the second triplexer 660, thereby simultaneously transmitting and receiving signals through the second communication. In an embodiment, the second communication circuit 620 may use one of the first antenna 650 and the second antenna 670 to transmit a transmission signal through the second communication, and may use the other to receive a reception signal through the second communication.

In an embodiment, in order to perform the second function, the second communication circuit 620 may use at least one of the first antenna 650 and the second antenna 670 to transmit and receive signals through the second communication. In an embodiment, the second communication circuit 620 may control the first switch 630 so as to be connected to the first triplexer 640 and/or the second triplexer 660, thereby transmitting and receiving signals through the second communication by the first antenna and/or the second antenna 670. In an embodiment, the second communication circuit may use one of the first antenna 650 and the second antenna 670 to transmit a transmission signal through the second communication, and may use the identical antenna to receive a reception signal through the second communication. In another embodiment, the second communication circuit 620 may use one of the first antenna 650 and the second antenna 670 to transmit a transmission signal through the second communication, and may use the other antenna to receive a reception signal through the second communication.

In an embodiment, in order to perform the third function, the second communication circuit 620 may use the third antenna 680 to receive a signal through the second communication. In an embodiment, the second communication circuit 620 may control the first switch 630 so as to be connected to the third antenna 680, thereby receiving a signal through the second communication by the third antenna 680. In an embodiment, in order to perform the third function, the second communication circuit 620 may use at least some among the third antenna 680, the fourth antenna 684, and the fifth antenna 685 to receive a signal through the second communication. In an embodiment, the second communication circuit 620 may control a switch (e.g., the SPDT switch 690 in FIG. 6) to switch between the fourth antenna 684 and the fifth antenna 685. In an embodiment, the second communication circuit 620 may perform the third function by controlling the SPDT switch 690 to simultaneously connect the third antenna 680 and the fourth antenna 684 so as to receive a signal of the second communication, or simultaneously connect the third antenna 680 and the fifth antenna 685 so as to receive a signal of the second communication.

Figure 7:
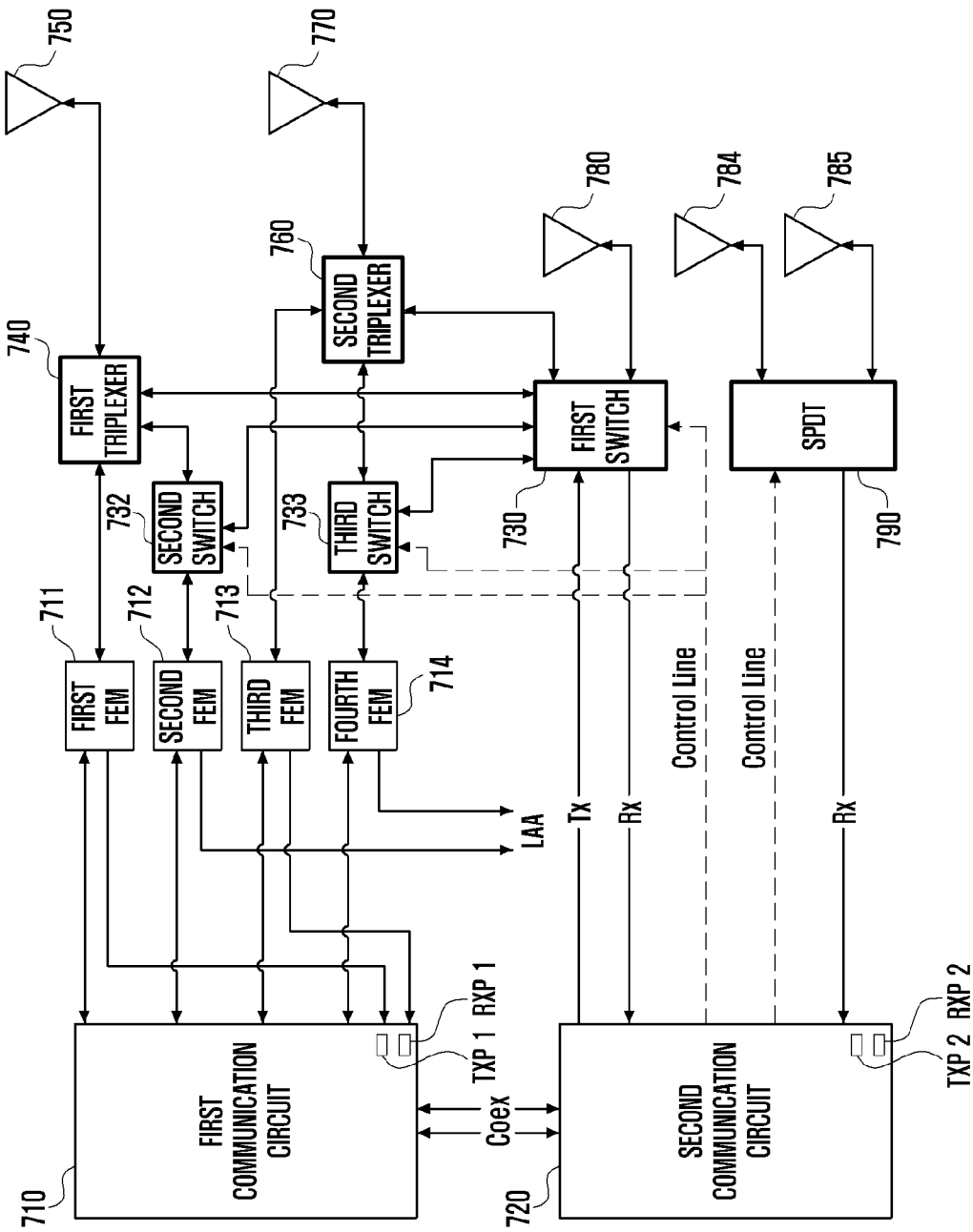
FIG. 7 is a block diagram illustrating an embodiment of communication circuits of an electronic device.

FIG. 7 is a block diagram illustrating an embodiment of communication circuits of an electronic device.

Referring to FIG. 7, the communication circuits in FIG. 7 may be obtained by specifying the communication circuits in FIG. 5. In an embodiment, the block diagram in FIG. 7 may include elements of the communication circuits, which are not illustrated in FIG. 5, or elements added in FIG. 5.

Referring to FIG. 7, an embodiment of an electronic device (e.g., the electronic device 101 in FIG. 1) according to the invention may include a first communication circuit (e.g., the first communication circuit 510 in FIG. 5), FEMs 711, 712, 713 and/or 714, a second communication circuit 720 (e.g., the second communication circuit 520 in FIG. 5), a first switch 730 (e.g., the first switch 530 in FIG. 5), a second switch 732, a third switch 733, a first triplexer 740 (e.g., the first branching filter 540 in FIG. 5), a first antenna (e.g., the first antenna 550 in FIG. 5), a second triplexer 760 (e.g., the second branching filter 560 in FIG. 5), a second antenna 770 (e.g., the second antenna 570 in FIG. 5), a third antenna 780 (e.g., the third antenna 580 in FIG. 5), a fourth antenna 784, a fifth antenna 785, and a switch SPDT 790.

Referring to FIG. 7, the electronic device 101 may include various elements (e.g., a front-end module, an amplifier, a switch, or a splitter) for receiving a signal through first communication or transmitting a signal through the first communication. The first communication may imply one of various types of wireless communication supported by the electronic device 101. In an embodiment, the first communication may include WiFi and/or Bluetooth communication supported by the electronic device 101. The electronic device 101 may use the first communication circuit 710 to control transmitting a signal through the first communication or receiving a signal through the first communication. In an embodiment, the first communication circuit 710 may include at least one reception port (e.g., a first reception port RXP1) for receiving a reception signal (e.g., RX) of the first communication and at least one transmission port (e.g., a first transmission port TXP1) for outputting a transmission signal (e.g., TX) of the first communication.

In an embodiment, the electronic device 101 may include the FEMs (e.g., a first FEM 711, a second FEM 712, a third FEM 713, and a fourth FEM 714) in order to receive or transmit a signal through the first communication.

In an embodiment of the invention, the first FEM 711 may transmit, to the first communication circuit 710, a reception signal of first communication that is obtained by amplifying a signal received through the first antenna 750 or removing noise of the received signal. The first FEM 711 may perform processing of amplifying a transmission signal of the first communication, transmitted by the first communication circuit 710, or removing noise. The processed signal may be output through the first antenna 750 via the first triplexer 740. A frequency band of a signal received or output by the first FEM 711 may be a partial frequency band (e.g., 2.4 GHz to 2.5 GHz) in a frequency band of the first communication.

In an embodiment of the invention, the second FEM 712 may transmit, to the first communication circuit 710, a reception signal of first communication that is obtained by amplifying a signal received through the first antenna 750 or removing noise of the received signal. The second FEM 712 may perform processing of amplifying a transmission signal of the first communication, transmitted by the first communication circuit 710, or removing noise. The processed signal may be output through the first antenna 750 via the first triplexer 740. A frequency band of a signal received or output by the second FEM 712 may be a partial frequency band (e.g., 5.15 GHz to 7.125 GHz) in the frequency band of the first communication. The frequency band (e.g., 5.15 GHz to 7.125 GHz) of a signal received or output by the second FEM 712 may include a frequency band (e.g., the first frequency band (a frequency of 6.25 GHz to 6.75 GHz)) which overlaps at least a part of that of a signal through second communication. In an embodiment, the second FEM 712 may be connected with the LAA part.

In an embodiment of the invention, the third FEM 713 may transmit, to the first communication circuit 710, a reception signal of first communication that is obtained by amplifying a signal received through the second antenna 770 or removing noise of the received signal. The third FEM 713 may perform processing of amplifying a transmission signal of the first communication, transmitted by the first communication circuit 710, or removing noise. The processed signal may be output through the second antenna 770 via the second triplexer 760. A frequency band of a signal received or output by the third FEM 713 may be a partial frequency band (e.g., 2.4 GHz to 2.5 GHz) in a frequency band of the first communication.

In an embodiment of the invention, the fourth FEM 714 may transmit, to the first communication circuit 710, a reception signal of first communication that is obtained by amplifying a signal received through the second antenna 770 or removing noise of the received signal. The fourth FEM 714 may perform processing of amplifying a transmission signal of the first communication, transmitted by the first communication circuit 710, or removing noise. The processed signal may be output through the second antenna 770 via the second triplexer 760. A frequency band of a signal received or output by the fourth FEM 714 may be a partial frequency band (e.g., 5.15 GHz to 7.125 GHz) in the frequency band of the first communication. The frequency band (e.g., 5.15 GHz to 7.125 GHz) of a signal received or output by the fourth FEM 714 may include a frequency band (e.g., the first frequency band (a frequency of 6.25 GHz to 6.75 GHz)) which overlaps at least a part of that of a signal by second communication. In an embodiment, the fourth FEM 714 may be connected with the LAA part.

In an embodiment, the electronic device 101 may include various elements (e.g., an amplifier, a switch, or a splitter) for receiving a signal through second communication or transmitting a signal through the second communication. The second communication may imply one of various types of wireless communication supported by the electronic device 101. In an embodiment, the second communication may include UWB communication supported by the electronic device 101. The electronic device 101 may use the second communication circuit 720 to control transmitting a signal through the second communication or receiving a signal through the second communication. In an embodiment, the second communication circuit 720 may include at least one reception port (e.g., the second reception port RXP2) for receiving a reception signal (e.g., RX) of the second communication and at least one transmission port (e.g., the second transmission port TXP2) for outputting a transmission signal (e.g., TX) of the second communication.

In an embodiment of the invention, a frequency band of the first communication and a frequency band of the second communication may at least partially overlap each other. In an embodiment, the frequency band of the first communication may include a frequency band of 2.4 GHz to 2.5 GHz and/or a frequency band of 5.15 GHz to 7.125 GHz. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the first communication and the frequency band of the second communication may overlap each other in the first frequency band (e.g., 6.25 GHz to 6.75 GHz).

In an embodiment, the first antenna 750 may receive a signal transmitted by an external electronic device, or may transmit a signal to the outside of the electronic device 101. The first antenna 750 may receive or output a signal of the frequency band (e.g., 2.4 GHz to 2.5 GHz and 5.15 GHz to 7.25 GHz) of the first communication and a signal of the frequency band (e.g., the first frequency band and/or the second frequency band) of the second communication. The first antenna 750 may receive or output a signal of a frequency band (e.g., 2.4 GHz to 2.5 GHz and/or 5.15 GHz to 8.25 GHz) having a range which includes the frequency band of the first communication and the frequency band of the second communication. In an embodiment, the first antenna 750 may include an LDS antenna.

In an embodiment, the second antenna 770 may receive a signal transmitted by an external electronic device, or may transmit a signal to the outside of the electronic device 101. The second antenna 770 may receive or output a signal of the frequency band (e.g., 2.4 GHz to 2.5 GHz and 5.15 GHz to 7.25 GHz) of the first communication and a signal of the frequency band (e.g., the first frequency band and/or the second frequency band) of the second communication. The second antenna 770 may receive or output a signal of a frequency band (e.g., 2.4 GHz to 2.5 GHz and/or 5.15 GHz to 8.25 GHz) having a range which includes the frequency band of the first communication and the frequency band of the second communication. In an embodiment, the second antenna 770 may include an LDS antenna.

In an embodiment, the third antenna 780 may receive a signal transmitted by an external electronic device, or may transmit a signal to the outside of the electronic device 101. The third antenna 780 may receive or output a signal of the frequency band (e.g., the first frequency band and/or the second frequency band) of the second communication. The third antenna 780 may receive or output a signal of a frequency band (e.g., 6.25 GHz to 8.25 GHz) having a range which includes the frequency band of the second communication. In an embodiment, the third antenna 780 may include a patch antenna.

In an embodiment, the fourth antenna 784 may receive a signal transmitted by an external electronic device. The fourth antenna 784 may receive a signal of the frequency band (e.g., the first frequency band and/or the second frequency band) of the second communication. The fourth antenna 784 may receive a signal of a frequency band (e.g., 6.25 GHz to 8.25 GHz) having a range which includes the frequency band of the second communication. In an embodiment, the fourth antenna 784 may include a patch antenna.

In an embodiment, the fifth antenna 785 may receive a signal transmitted by an external electronic device. The fifth antenna 785 may receive a signal of the frequency band (e.g., the first frequency band and/or the second frequency band) of the second communication. The fifth antenna 785 may receive a signal of a frequency band (e.g., 6.25 GHz to 8.25 GHz) having a range which includes the frequency band of the second communication. In an embodiment, the fifth antenna 785 may include a patch antenna.

In an embodiment, the first triplexer 740 may filter, based on a frequency band, a signal received by the first antenna 750. In an embodiment, the first triplexer 740 may transfer a signal of the frequency band of the first communication, among signals received from the first antenna 750, to the first communication circuit 710. In an embodiment, the first triplexer 740 may transfer, to the first switch 730, a signal of at least a partial band (e.g., the second frequency band) of the frequency band of the second communication, among the received signals. In an embodiment, the first triplexer 740 may separate signals of the first communication, among signals received from the first antenna 750, into at least two frequency bands (e.g., a frequency band of 2.4 GHz to 2.5 GHz and a frequency band of 5.15 GHz to 7.125 GHz) and transfer the signals to the first communication circuit 710, and may transfer, to the first switch 730, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 710, may be transferred to the first communication circuit 710 through different front-end modules (e.g., the first FEM 711 or the second FEM 712), respectively. The second FEM 712 may be connected to the first triplexer 740 through the second switch 732. In an embodiment, the first triplexer 740 may transfer a signal of the second frequency band (e.g., a signal through the second communication including a frequency band of 7.75 GHz to 8.25 GHz) to the first switch 730, may transfer signals having frequency bands overlapping each other (e.g., a first communication signal of the 5.15 GHz to 7.125 GHz band and/or a second communication signal of a 6.25 GHz to 6.75 GHz band), among first communication signals and/or second communication signals, to the second FEM 712 through the second switch 732, and may transfer, to the first FEM 711, a signal having a frequency band which does not overlap that of the second communication (e.g., a first communication signal of the 2.4 GHz to 2.5 GHz band), among signals of the first communication.

In an embodiment, the second switch 732 may receive, from the first triplexer 740, signals having frequency bands overlapping each other (e.g., a first communication signal of the 5.15 GHz to 7.125 GHz band and/or a second communication signal of a 6.25 GHz to 6.75 GHz band (e.g., a second communication signal of the first frequency band)), among first communication signals and/or second communication signals. The second communication circuit 720 may control the second switch 732 such that the first triplexer is connected to the first switch 730 when performing the second communication and such that the first triplexer 740 is connected to the second FEM 712 when performing the first communication. Therefore, in the circuits in FIG. 7, the electronic device 101 may perform communication by a reception signal and/or a transmission signal through the second communication of the first frequency band (e.g., the 6.25 GHz to 6.75 GHz band).

In an embodiment, the second triplexer 760 may filter, based on a frequency band, a signal received by the second antenna 770. In an embodiment, the second triplexer may transfer a signal of the frequency band of the first communication, among signals received from the second antenna 770, to the first communication circuit 710. In an embodiment, the second triplexer 760 may transfer, to the first switch 730, a signal of at least a partial band (e.g., the second frequency band) of the frequency band of the second communication, among the received signals. In an embodiment, the second triplexer 760 may separate signals of the first communication, among signals received from the second antenna 770, into at least two frequency bands (e.g., a frequency band of 2.4 GHz to 2.5 GHz and a frequency band of 5.15 GHz to 7.125 GHz) and transfer the signals to the first communication circuit 710, and may transfer, to the first switch 730, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 710, may be transferred to the first communication circuit 710 through different front-end modules (e.g., the third FEM 713 or the fourth FEM 714), respectively. The fourth FEM 714 may be connected to the first triplexer 740 through the third switch 733. In an embodiment, the second triplexer 760 may transfer a signal of the second frequency band (e.g., a signal through the second communication including a frequency band of 7.75 GHz to 8.25 GHz) to the first switch 730, may transfer signals having frequency bands overlapping each other (e.g., a first communication signal of the 5.15 GHz to 7.125 GHz band and/or a second communication signal of a 6.25 GHz to 6.75 GHz band), among first communication signals and/or second communication signals, to the fourth FEM 714 through the third switch 733, and may transfer, to the third FEM 713, a signal having a frequency band which does not overlap that of the second communication (e.g., a first communication signal of the 2.4 GHz to 2.5 GHz band), among signals of the first communication.

In an embodiment, the third switch 733 may receive, from the second triplexer 760, signals having frequency bands overlapping each other (e.g., a first communication signal of the 5.15 GHz to 7.125 GHz band and/or a second communication signal of a 6.25 GHz to 6.75 GHz band (e.g., a second communication signal of the first frequency band)), among first communication signals and/or second communication signals. The second communication circuit 720 may control the third switch 733 such that the second triplexer is connected to the first switch 730 when performing the second communication and such that the second triplexer 760 is connected to the fourth FEM 714 when performing the first communication. Therefore, in the circuit in FIG. 7, the electronic device 101 may perform communication by a reception signal and/or a transmission signal through the second communication of the first frequency band (e.g., the 6.25 GHz to 6.75 GHz band).

In an embodiment, the first switch 730 may be connected to the second communication circuit 720 to switch between the first triplexer 740, the second triplexer 760, and the third antenna 780. In an embodiment, the first switch 730 may be implemented as a switch which includes multiple poles connected to at least one of a reception port of the second communication circuit 720 and a transmission port of the second communication circuit 720, and multiple output terminals (throws) connected to at least one among the first triplexer 740, the second triplexer 760, the second switch 732, the third switch 733, and/or the third antenna 780. In an embodiment, the first switch 730 in FIG. 7 may include a double pole five throw ("DP5T"). In an embodiment, the second communication circuit may control the first switch 730 in consideration of a frequency band of a reception signal of the second communication or a frequency band of a transmission signal of the second communication.

In an embodiment, the second switch 732 may be connected to the second communication circuit 720 through the second FEM 712 so as to switch between the first triplexer 740 and the first switch 730. In an embodiment, the second switch 732 may be implemented as a switch which includes one pole connected to the second FEM 712, and multiple output terminals (throws) connected to the first triplexer 740 and/or the first switch 730. In an embodiment, the second switch 732 in FIG. 7 may include an SPDT. In an embodiment, the second communication circuit 720 may control the second switch in consideration of a frequency band of a reception signal of the second communication or a frequency band of a transmission signal of the second communication.

In an embodiment, the third switch 733 may be connected to the second communication circuit 720 through the fourth FEM 714 so as to switch between the second triplexer 760 and the first switch 730. In an embodiment, the third switch 733 may be implemented as a switch which includes one pole connected to the fourth FEM 714, and multiple output terminals (throws) connected to the second triplexer 760 and/or the first switch 730. In an embodiment, the third switch 733 in FIG. 7 may include an SPDT. In an embodiment, the second communication circuit 720 may control the third switch 733 in consideration of a frequency band of a reception signal of the second communication or a frequency band of a transmission signal of the second communication.

In an embodiment, the second communication circuit 720 may transmit, to the first communication circuit 710, a signal requesting for receiving a reception signal through the second communication. In an embodiment, signals may be transmitted between the first communication circuit 710 and the second communication circuit 720 via the Coex interface, but is not limited thereto. The second communication circuit 720 may control the first switch 730 to receive a reception signal of the second communication through the first antenna 750 and/or the second antenna 770.

In an embodiment, the second communication circuit 720 may transmit, to the first communication circuit 710, a signal requesting for transmitting a transmission signal through the second communication. The second communication circuit 720 may control the first switch 730 to transmit a transmission signal of the second communication through the first antenna 750 and/or the second antenna 770.

In an embodiment, the second communication circuit 720 may control the first switch 730, the second switch 732 and/or the third switch 733 to perform a first function (e.g., the first function in FIG. 2), a second function (e.g., the second function in FIG. 3), and/or a third function (e.g., the third function in FIG. 4).

In an embodiment, in order to perform the first function, the second communication circuit 720 may simultaneously use the first antenna 750 and the second antenna 770 to transmit and receive a second communication signal. In an embodiment, the second communication circuit 720 may control the first switch 730 so as to be connected to the first triplexer 740 and the second triplexer 760, thereby simultaneously transmitting and receiving signals through the second communication. In an embodiment, the second communication circuit 720 may use one of the first antenna 750 and the second antenna 770 to transmit a transmission signal through the second communication, and may use the other to receive a reception signal through the second communication. At this time, the second communication circuit 720 may perform the second communication by a reception signal and/or a transmission signal through the second communication having a frequency band (e.g., the second frequency band: a frequency band of 7.75 GHz to 8.25 GHz) which does not overlap the frequency band of the first communication.

In another embodiment, the second communication circuit 720 may control the first switch 730, the second switch 732, and the third switch 733 such that the first switch is connected to the second switch 732 and the third switch 733, and the second switch and the third switch 733 are connected to the first triplexer 740 and the second triplexer 760, respectively, thereby simultaneously transmitting and receiving signals through the second communication. At this time, the second communication circuit 720 may perform the second communication by a reception signal and/or a transmission signal through the second communication having a frequency band (e.g., the first frequency band: a frequency band of 6.25 GHz to 6.75 GHz) which at least partially overlaps the frequency band of the first communication. In an embodiment, the second communication circuit 720 may use one of the first antenna 750 and the second antenna 770 to transmit a transmission signal through the second communication, and may use the other to receive a reception signal through the second communication.

In an embodiment, in order to perform the second function, the second communication circuit 720 may use at least one of the first antenna 750 and the second antenna 770 to transmit and receive signals through the second communication. In an embodiment, the second communication circuit 720 may control the first switch 730 so as to be connected to the first triplexer 740 and/or the second triplexer 760, thereby transmitting and receiving signals through the second communication by the first antenna 750 and/or the second antenna 770. In an embodiment, the second communication circuit may use one of the first antenna 750 and the second antenna 770 to transmit a transmission signal through the second communication, and may use the identical antenna to receive a reception signal through the second communication. In another embodiment, the second communication circuit 720 may use one of the first antenna 750 and the second antenna 770 to transmit a transmission signal through the second communication, and may use the other antenna to receive a reception signal through the second communication.

In an embodiment, in order to perform the third function, the second communication circuit 720 may use the third antenna 780 to receive a signal through the second communication. In an embodiment, the second communication circuit 720 may control the first switch 730 so as to be connected to the third antenna 780, thereby receiving a signal through the second communication by the third antenna 780. In an embodiment, in order to perform the third function, the second communication circuit 720 may use at least some among the third antenna 780, the fourth antenna 784, and the fifth antenna 785 to receive a signal through the second communication. In an embodiment, the second communication circuit 720 may control a switch (e.g., the SPDT switch 790 in FIG. 7) to switch between the fourth antenna 784 and the fifth antenna 785. In an embodiment, the second communication circuit 720 may perform the third function by controlling the SPDT switch 790 to simultaneously connect the third antenna 780 and the fourth antenna 784 so as to receive a signal of the second communication, or simultaneously connect the third antenna 780 and the fifth antenna 785 so as to receive a signal of the second communication.

Figure 8:
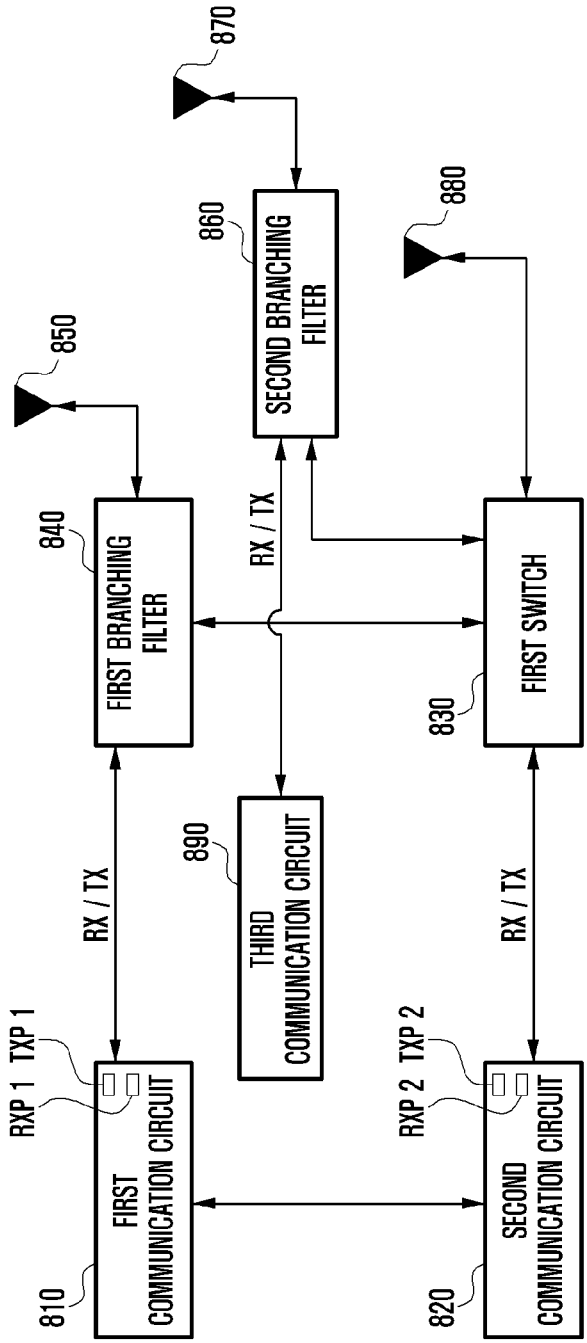
FIG. 8 is a block diagram illustrating an embodiment of communication circuits of an electronic device.

FIG. 8 is a block diagram illustrating an embodiment of communication circuits of an electronic device.

Referring to FIG. 8, an embodiment of an electronic device (e.g., the electronic device 101 in FIG. 1) according to the invention may include a first communication circuit 810, a second communication circuit 820, a third communication circuit 890, a first switch 830, a first branching filter 840, a first antenna 850, a second branching filter 860, a second antenna 870, and a third antenna 880.

In an embodiment, the electronic device 101 may include various elements (e.g., a front-end module, an amplifier, a switch, or a splitter) for receiving a signal through first communication or transmitting a signal through the first communication. The first communication may imply one of various types of wireless communication supported by the electronic device 101. In an embodiment, the first communication may include WiFi and/or Bluetooth communication supported by the electronic device 101. The electronic device 101 may use the first communication circuit 810 to control transmitting a signal through the first communication or receiving a signal through the first communication. In an embodiment, the first communication circuit 810 may include at least one reception port (e.g., a first reception port RXP1) for receiving a reception signal (e.g., RX) of the first communication and at least one transmission port (e.g., a first transmission port TXP1) for outputting a transmission signal (e.g., TX) of the first communication.

In an embodiment, the electronic device 101 may include various elements (e.g., an amplifier, a switch, or a splitter) for receiving a signal through second communication or transmitting a signal through the second communication. The second communication may imply one of various types of wireless communication supported by the electronic device 101. In an embodiment, the second communication may include UWB communication supported by the electronic device 101. The electronic device 101 may use the second communication circuit 820 to control transmitting a signal through the second communication or receiving a signal through the second communication. In an embodiment, the second communication circuit 820 may include at least one reception port (e.g., the second reception port RXP2) for receiving a reception signal (e.g., RX) of the second communication and at least one transmission port (e.g., the second transmission port TXP2) for outputting a transmission signal (e.g., TX) of the second communication.

In an embodiment, the electronic device 101 may include various elements (e.g., a front-end module, an amplifier, a switch, or a splitter) for receiving a signal through third communication or transmitting a signal through the third communication. The third communication may imply one of various types of wireless communication supported by the electronic device 101. In an embodiment, the third communication may include cellular communication supported by the electronic device 101. In an embodiment, the third communication may include NR, long-term evolution ("LTE"), third-generation cellular communication, or second-generation cellular communication. The electronic device 101 may use the third communication circuit 890 to control transmitting a signal through the third communication or receiving a signal through the third communication.

In an embodiment of the invention, a frequency band of the first communication and a frequency band of the second communication may at least partially overlap each other. In an embodiment, the frequency band of the first communication may include a frequency band of 2.4 GHz to 2.5 GHz and/or a frequency band of 5.15 GHz to 7.125 GHz. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the first communication and the frequency band of the second communication may overlap each other in the first frequency band (e.g., 6.25 GHz to 6.75 GHz).

In an embodiment of the invention, a frequency band of the third communication may include a frequency band which does not overlap the frequency band of the first communication and/or the frequency band of the second communication. In an embodiment, the frequency band of the third communication may include a frequency band of 3.30 GHz to a predetermined upper frequency. In an embodiment, the predetermined upper frequency may be equal to or greater than 6.25 GHz and equal to or less than 7.75 GHz. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the third communication and the frequency band of the second communication may overlap each other in the first frequency band (e.g., 6.25 GHz to 6.75 GHz).

In an embodiment, the first antenna 850 may receive a signal transmitted by an external electronic device, or may transmit a signal to the outside of the electronic device 101. The first antenna 850 may receive or output a signal of the frequency band (e.g., 2.4 GHz to 2.5 GHz and 5.15 GHz to 7.25 GHz) of the first communication and a signal of the frequency band (e.g., the first frequency band and/or the second frequency band) of the second communication. The first antenna 850 may receive or output a signal of a frequency band (e.g., 2.4 GHz to 2.5 GHz and/or 5.15 GHz to 8.25 GHz) having a range which includes the frequency band of the first communication and the frequency band of the second communication.

In an embodiment, the second antenna 870 may receive a signal transmitted by an external electronic device, or may transmit a signal to the outside of the electronic device 101. The second antenna 870 may receive or output a signal of the frequency band of the third communication and a signal of the frequency band (e.g., the first frequency band and/or the second frequency band) of the second communication. The second antenna 870 may receive or output a signal of a frequency band (e.g., 3.30 GHz to 8.25 GHz) having a range which includes the frequency band of the third communication and the frequency band of the second communication.

In an embodiment, the third antenna 880 may receive a signal transmitted by an external electronic device, or may transmit a signal to the outside of the electronic device 101. The third antenna 880 may receive or output a signal of the frequency band (e.g., the first frequency band and/or the second frequency band) of the second communication. The third antenna 880 may receive or output a signal of a frequency band (e.g., 6.25 GHz to 8.25 GHz) having a range which includes the frequency band of the second communication.

In an embodiment, the first branching filter 840 may filter, based on a frequency band, a signal received by the first antenna 850. In an embodiment, the first branching filter 840 may transfer a signal of the frequency band of the first communication, among signals received from the first antenna 850, to the first communication circuit 810. In an embodiment, the first branching filter 840 may transfer, to the first switch 830, a signal of at least a partial band (e.g., the second frequency band) of the frequency band of the second communication, among the received signals. In an embodiment, the first branching filter may include a triplexer. The first branching filter 840 may include, without being limited to the triplexer, various branching filter elements, such as a diplexer and a quadplexer, branching into multiple paths. When the first branching filter 840 includes the triplexer, the first branching filter 840 may separate signals of the first communication, among signals received from the first antenna 850, into signals of at least two frequency bands (e.g., a frequency band of 2.4 GHz to 2.5 GHz and a frequency band of 5.15 GHz to 7.125 GHz) and transfer the signals to the first communication circuit 810, and may transfer, to the first switch 830, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 810, may be transferred to the first communication circuit 810 through different front-end modules, respectively.

In an embodiment, the second branching filter 860 may filter, based on a frequency band, a signal received by the second antenna 870. In an embodiment, the second branching filter 860 may transfer a signal of the frequency band of the third communication, among signals received from the second antenna 870, to the third communication circuit 890. In an embodiment, the second branching filter 860 may transfer, to the first switch 830, a signal of at least a partial band (e.g., the second frequency band) of the frequency band of the second communication, among the received signals. In an embodiment, the second branching filter 860 may include a diplexer. The second branching filter 860 may include, without being limited to the diplexer, various branching filter elements, such as a triplexer and a quadplexer, branching into multiple paths. When the second branching filter 860 includes the diplexer, the second branching filter 860 may separate signals of the frequency of the third communication, among signals received from the second antenna 870, and transfer the signals to the third communication circuit 890, and may separate a signal of a frequency band (e.g., a signal of the second frequency band), which does not overlap that of the third communication, among signals of the second communication, and transfer the signal to the first switch 830.

In an embodiment, the first switch 830 may be connected to the second communication circuit 820 to switch between the first branching filter 840, the second branching filter 860, and the third antenna 880. In an embodiment, the first switch 830 may be implemented as a switch which includes multiple poles connected to at least one of a reception port of the second communication circuit 820 and a transmission port of the second communication circuit 820, and multiple output terminals (throws) connected to at least one among the first branching filter 840, the second branching filter 860, and/or the third antenna 880. In an embodiment, the first switch 830 in FIG. 8 may include a DP3T. In an embodiment, the second communication circuit may control the first switch in consideration of a frequency band of a reception signal of the second communication or a frequency band of a transmission signal of the second communication.

In an embodiment, the second communication circuit 820 may transmit, to the first communication circuit 810, a signal requesting for receiving a reception signal through the second communication. The second communication circuit 820 may control the first switch 830 to receive a reception signal of the second communication through the first antenna 850.

In an embodiment, the second communication circuit 820 may transmit, to the third communication circuit 890, a signal requesting for receiving a reception signal through the second communication. The second communication circuit 820 may control the first switch 830 to receive a reception signal of the second communication through the second antenna 870.

In an embodiment, the second communication circuit 820 may transmit, to the first communication circuit 810, a signal requesting for transmitting a transmission signal through the second communication. The second communication circuit 820 may control the first switch 830 to transmit a transmission signal of the second communication through the first antenna 850.

In an embodiment, the second communication circuit 820 may transmit, to the third communication circuit 890, a signal requesting for transmitting a transmission signal through the second communication. The second communication circuit 820 may control the first switch 830 to transmit a transmission signal of the second communication through the second antenna 870.

In an embodiment, the second communication circuit 820 may control the first switch 830 to perform a first function (e.g., the first function in FIG. 2), a second function (e.g., the second function in FIG. 3), and/or a third function (e.g., the third function in FIG. 4).

In an embodiment, in order to perform the first function, the second communication circuit 820 may simultaneously use the first antenna 850 and the second antenna 870 to transmit and receive a second communication signal. In an embodiment, the second communication circuit 820 may control the first switch 830 so as to be connected to the first branching filter 840 and the second branching filter 860, thereby simultaneously transmitting and receiving signals through the second communication. In an embodiment, the second communication circuit 820 may use one of the first antenna and the second antenna 870 to transmit a transmission signal through the second communication, and may use the other to receive a reception signal through the second communication.

In an embodiment, in order to perform the second function, the second communication circuit 820 may use at least one of the first antenna 850 and the second antenna 870 to transmit and receive signals through the second communication. In an embodiment, the second communication circuit 820 may control the first switch 830 so as to be connected to the first branching filter 840 and/or the second branching filter 860, thereby transmitting and receiving signals through the second communication by the first antenna 850 and/or the second antenna 870. In an embodiment, the second communication circuit 820 may use one of the first antenna 850 and the second antenna to transmit a transmission signal through the second communication, and may use the identical antenna to receive a reception signal through the second communication. In another embodiment, the second communication circuit 820 may use one of the first antenna 850 and the second antenna 870 to transmit a transmission signal through the second communication, and may use the other antenna to receive a reception signal through the second communication.

In an embodiment, in order to perform the third function, the second communication circuit 820 may use the third antenna 880 to receive a signal through the second communication. In an embodiment, the second communication circuit 820 may control the first switch 830 so as to be connected to the third antenna 880, thereby receiving a signal through the second communication by the third antenna 880.

Figure 9:
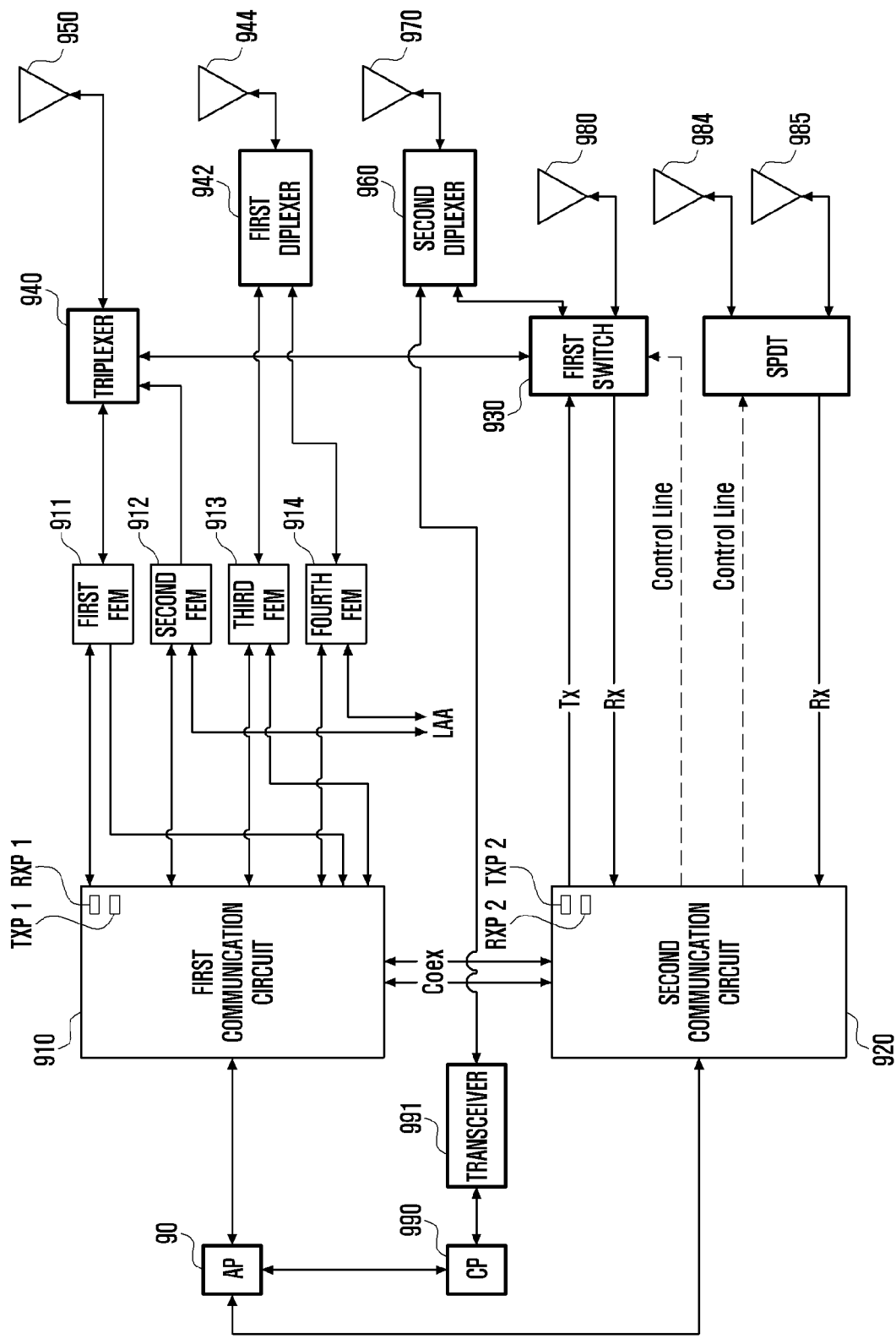
FIG. 9 is a block diagram illustrating an embodiment of communication circuits of an electronic device.

FIG. 9 is a block diagram illustrating an embodiment of communication circuits of an electronic device.

Referring to FIG. 9, the communication circuits in FIG. 9 may be obtained by specifying the communication circuits in FIG. 8. In an embodiment, the block diagram in FIG. 9 may include elements of the communication circuits, which are not illustrated in FIG. 8, or elements added in FIG. 8.

Referring to FIG. 9, an embodiment of an electronic device (e.g., the electronic device 101 in FIG. 1) according to the invention may include a first communication circuit (e.g., the first communication circuit 810 in FIG. 8), FEMs 911, 912, 913 and/or 914, a second communication circuit 920 (e.g., the second communication circuit 820 in FIG. 8), a communication processor 990 (e.g., the third communication circuit 890 in FIG. 8), a first switch 930 (e.g., the first switch 830 in FIG. 8), a triplexer 940 (e.g., the first branching filter 840 in FIG. 8), a first antenna 950 (e.g., the first antenna 850 in FIG. 8), a first diplexer 942, a second diplexer 960 (e.g., the second branching filter 860 in FIG. 8), a second antenna 970 (e.g., the second antenna 870 in FIG. 8), a third antenna 980 (e.g., the third antenna 880 in FIG. 8), a fourth antenna 984, a fifth antenna 985, a sixth antenna 944, and/or an SPDT switch.

In an embodiment of the invention, the electronic device 101 may include the communication processor 990 (e.g., the communication module 190 in FIG. 1) for performing an operation related to first communication, second communication, or third communication and/or an application processor 90 (e.g., the processor 120 in FIG. 1) for processing data using the first communication, the second communication, or the third communication. In an embodiment, the communication processor 990 and the application processor 90 may be formed as a single chip.

In an embodiment of the invention, the communication processor 990 may be connected to the transceiver 991, and may control the transceiver 991.

The transceiver 991 may process a reception signal of the third communication, which has been received, and may transmit the processed reception signal to the communication processor 990. The communication processor 990 may transmit, to the application processor 90, data included in the reception signal of the third communication.

Referring to FIG. 9, the electronic device 101 may include various elements (e.g., a front-end module, an amplifier, a switch, or a splitter) for receiving a signal through first communication or transmitting a signal through the first communication. The first communication may imply one of various types of wireless communication supported by the electronic device 101. In an embodiment, the first communication may include WiFi and/or Bluetooth communication supported by the electronic device 101. The electronic device 101 may use the first communication circuit 910 to control transmitting a signal through the first communication or receiving a signal through the first communication. In an embodiment, the first communication circuit 910 may include at least one reception port (e.g., a first reception port RXP1) for receiving a reception signal (e.g., RX) of the first communication and at least one transmission port (e.g., a first transmission port TXP1) for outputting a transmission signal (e.g., TX) of the first communication.

In an embodiment, the electronic device 101 may include the FEMs (e.g., a first FEM 911 and a second FEM 912) in order to receive or transmit a signal through the first communication.

In an embodiment of the invention, the first FEM 911 may transmit, to the first communication circuit 910, a reception signal of first communication that is obtained by amplifying a signal received through the first antenna 950 or removing noise of the received signal. The first FEM 911 may perform processing of amplifying a transmission signal of the first communication, transmitted by the first communication circuit 910, or removing noise. The processed signal may be output through the first antenna 950 via the triplexer 940. A frequency band of a signal received or output by the first FEM 911 may be a partial frequency band (e.g., 2.4 GHz to 2.5 GHz) in a frequency band of the first communication.

In an embodiment of the invention, the second FEM 912 may transmit, to the first communication circuit 910, a reception signal of first communication that is obtained by amplifying a signal received through the first antenna 950 or removing noise of the received signal. The second FEM 912 may perform processing of amplifying a transmission signal of the first communication, transmitted by the first communication circuit 910, or removing noise. The processed signal may be output through the first antenna 950 via the triplexer 940. A frequency band of a signal received or output by the second FEM 912 may be a partial frequency band (e.g., 5.15 GHz to 7.125 GHz) in the frequency band of the first communication. The frequency band (e.g., 5.15 GHz to 7.125 GHz) of a signal received or output by the second FEM 912 may include a frequency band (e.g., the first frequency band (a frequency of 6.25 GHz to 6.75 GHz)) which overlaps at least a part of that of a signal by second communication. In an embodiment, the second FEM 912 may be connected with the LAA part.

In an embodiment of the invention, the third FEM 913 may transmit, to the first communication circuit 910, a reception signal of first communication that is obtained by amplifying a signal received through the sixth antenna 944 or removing noise of the received signal. The third FEM 913 may perform processing of amplifying a transmission signal of the first communication, transmitted by the first communication circuit 910, or removing noise. The processed signal may be output through the sixth antenna 944 via the first diplexer 942. A frequency band of a signal received or output by the third FEM may be a partial frequency band (e.g., 2.4 GHz to 2.5 GHz) in the frequency band of the first communication.

In an embodiment of the invention, the fourth FEM 914 may transmit, to the first communication circuit 910, a reception signal of first communication that is obtained by amplifying a signal received through the sixth antenna 944 or removing noise of the received signal. The fourth FEM 914 may perform processing of amplifying a transmission signal of the first communication, transmitted by the first communication circuit 910, or removing noise. The processed signal may be output through the sixth antenna 944 via the first diplexer 942. A frequency band of a signal received or output by the fourth FEM 914 may be a partial frequency band (e.g., 5.15 GHz to 7.125 GHz) in the frequency band of the first communication. The frequency band (e.g., 5.15 GHz to 7.125 GHz) of a signal received or output by the fourth FEM 914 may include a frequency band (e.g., the first frequency band (a frequency of 6.25 GHz to 6.75 GHz)) which overlaps at least a part of that of a signal by second communication. In an embodiment, the fourth FEM 914 may be connected with the LAA part.

In an embodiment, the electronic device 101 may include various elements (e.g., an amplifier, a switch, or a splitter) for receiving a signal through second communication or transmitting a signal through the second communication.

The second communication may imply one of various types of wireless communication supported by the electronic device 101. In an embodiment, the second communication may include UWB communication supported by the electronic device 101. The electronic device 101 may use the second communication circuit 920 to control transmitting a signal through the second communication or receiving a signal through the second communication. In an embodiment, the second communication circuit 920 may include at least one reception port (e.g., the second reception port RXP2) for receiving a reception signal (e.g., RX) of the second communication and at least one transmission port (e.g., the second transmission port TXP2) for outputting a transmission signal (e.g., TX) of the second communication.

In an embodiment, the electronic device 101 may include various elements (e.g., a front-end module, an amplifier, a switch, or a splitter) for receiving a signal through third communication or transmitting a signal through the third communication. The third communication may imply one of various types of wireless communication supported by the electronic device 101. In an embodiment, the third communication may include cellular communication supported by the electronic device 101. In an embodiment, the third communication may include NR, LTE, third-generation cellular communication, or second-generation cellular communication. The electronic device 101 may use the third communication circuit 890 to control transmitting a signal through the third communication or receiving a signal through the third communication.

In an embodiment of the invention, a frequency band of the first communication and a frequency band of the second communication may at least partially overlap each other. In an embodiment, the frequency band of the first communication may include a frequency band of 2.4 GHz to 2.5 GHz and/or a frequency band of 5.15 GHz to 7.125 GHz. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the first communication and the frequency band of the second communication may overlap each other in the first frequency band (e.g., 6.25 GHz to 6.75 GHz).

In an embodiment of the invention, a frequency band of the third communication and a frequency band of the second communication may at least partially overlap each other. In an embodiment, when the second communication is a UWB, the frequency band of the second communication may include a frequency band of 6.25 GHz to 6.75 GHz (e.g., the first frequency band) and/or a frequency band of 7.75 GHz to 8.25 GHz (e.g., the second frequency band). Therefore, the frequency band of the third communication and the frequency band of the second communication may overlap each other in the first frequency band (e.g., 6.25 GHz to 6.75 GHz).

In an embodiment, the first antenna 950 may receive a signal transmitted by an external electronic device, or may transmit a signal to the outside of the electronic device 101. The first antenna 950 may receive or output a signal of the frequency band (e.g., 2.4 GHz to 2.5 GHz and 5.15 GHz to 7.25 GHz) of the first communication and a signal of the frequency band (e.g., the first frequency band and/or the second frequency band) of the second communication. The first antenna 950 may receive or output a signal of a frequency band (e.g., 2.4 GHz to 2.5 GHz and/or 5.15 GHz to 8.25 GHz) having a range which includes the frequency band of the first communication and the frequency band of the second communication. In an embodiment, the first antenna 950 may include an LDS antenna.

In an embodiment, the second antenna 970 may receive a signal transmitted by an external electronic device, or may transmit a signal to the outside of the electronic device 101. The second antenna 970 may receive or output a signal of the frequency band of the third communication and a signal of the frequency band (e.g., the first frequency band and/or the second frequency band) of the second communication. The second antenna 970 may receive or output a signal of a frequency band (e.g., 3.30 GHz to 8.25 GHz) having a range which includes the frequency band of the third communication and the frequency band of the second communication. In an embodiment, the second antenna may include an LDS antenna.

In an embodiment, the third antenna 980 may receive a signal transmitted by an external electronic device, or may transmit a signal to the outside of the electronic device 101. The third antenna 980 may receive or output a signal of the frequency band (e.g., the first frequency band and/or the second frequency band) of the second communication. The third antenna 980 may receive or output a signal of a frequency band (e.g., 6.25 GHz to 8.25 GHz) having a range which includes the frequency band of the second communication. In an embodiment, the third antenna 980 may include a patch antenna.

In an embodiment, the fourth antenna 984 may receive a signal transmitted by an external electronic device, or may transmit a signal to the outside of the electronic device 101. The fourth antenna 984 may receive or output a signal of the frequency band (e.g., the first frequency band and/or the second frequency band) of the second communication. The fourth antenna 984 may receive or output a signal of a frequency band (e.g., 6.25 GHz to 8.25 GHz) having a range which includes the frequency band of the second communication. In an embodiment, the fourth antenna 984 may include a patch antenna.

In an embodiment, the fifth antenna 985 may receive a signal transmitted by an external electronic device, or may transmit a signal to the outside of the electronic device 101. The fifth antenna 985 may receive or output a signal of the frequency band (e.g., the first frequency band and/or the second frequency band) of the second communication. The fifth antenna 985 may receive or output a signal of a frequency band (e.g., 6.25 GHz to 8.25 GHz) having a range which includes the frequency band of the second communication. In an embodiment, the fifth antenna 985 may include a patch antenna.

In an embodiment, the sixth antenna 944 may receive a signal transmitted by an external electronic device, or may transmit a signal to the outside of the electronic device 101. The sixth antenna 944 may receive or output a signal of the frequency band (e.g., 2.4 GHz to 2.5 GHz and 5.15 GHz to 7.125 GHz) of the first communication and a signal of the frequency band (e.g., the first frequency band and/or the second frequency band) of the second communication. In an embodiment, the sixth antenna 944 may include an LDS antenna and/or a metal antenna.

In an embodiment, the triplexer 940 may filter, based on a frequency band, a signal received by the first antenna 950. In an embodiment, the triplexer 940 may transfer a signal of the frequency band of the first communication, among signals received from the first antenna 950, to the first communication circuit 910. In an embodiment, the triplexer 940 may transfer, to the first switch 930, a signal of at least a partial band (e.g., the second frequency band) of the frequency band of the second communication, among the received signals. In an embodiment, the triplexer 940 may separate signals of the first communication, among signals received from the first antenna 950, into at least two frequency bands (e.g., a frequency band of 2.4 GHz to 2.5 GHz and a frequency band of 5.15 GHz to 7.125 GHz) and transfer the signals to the first communication circuit 910, and may transfer, to the first switch 930, a signal of a frequency band (e.g., a signal of the second frequency band), which does not overlap that of the first communication, among signals of the second communication. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 910, may be transferred to the first communication circuit 910 through different front-end modules (e.g., the first FEM 911 or the second FEM 912), respectively. In an embodiment, the triplexer 940 may transfer a signal of the second frequency band (e.g., a signal through the second communication including a frequency band of 7.75 GHz to 8.25 GHz) to the first switch 930, may transfer, to the second FEM 912, a signal having a frequency band overlapping that of the second communication (e.g., a first communication signal of the 5.15 GHz to 7.125 GHz band), among signals of the first communication, and may transfer, to the first FEM 911, a signal having a frequency band which does not overlap that of the second communication (e.g., a first communication signal of the 2.4 GHz to 2.5 GHz band), among signals of the first communication.

In an embodiment, the first diplexer 942 may filter, based on a frequency band, a signal received by the sixth antenna 944. In an embodiment, the first diplexer 942 may transfer a signal of the frequency band of the first communication, among signals received from the sixth antenna 944, to the first communication circuit 910. In an embodiment, the first diplexer 942 may separate signals of the first communication, among signals received from the sixth antenna 944, into at least two frequency bands (e.g., a frequency band of 2.4 GHz to 2.5 GHz and a frequency band of 5.15 GHz to 7.125 GHz) and transfer the signals to the first communication circuit 910. In an embodiment, the signals of the first communication, which are separated into at least two frequency bands (e.g., a frequency band of 2.4 GHz to 2.5 GHz and a frequency band of 5.15 GHz to 7.125 GHz) and transferred to the first communication circuit 910, may be transferred to the first communication circuit 910 through different front-end modules (e.g., the third FEM 914 or the fourth FEM 714), respectively. In an embodiment, the first diplexer 942 may transfer a signal of a partial frequency band (e.g., a first communication signal of a 5.15 GHz to 7.125 GHz band), among signals of the first communication, to the fourth FEM 914, and may transfer a signal of the remaining frequency band (e.g., a first communication signal of a 2.4 GHz to 2.5 GHz band) to the third FEM 913.

In an embodiment, the second diplexer 960 may filter, based on a frequency band, a signal received by the second antenna 970. In an embodiment, the second diplexer 960 may transfer a signal of the frequency band of the third communication, among signals received from the second antenna 970, to the communication processor 990 through the transceiver 991. In an embodiment, the second diplexer 960 may transfer, to the first switch 930, a signal of at least a partial band (e.g., the second frequency band) of the frequency band of the second communication, among the received signals. In an embodiment, the second diplexer 960 may separate signals of the third communication, among signals received from the second antenna 970, into at least two frequency bands (e.g., a frequency band of 3.30 GHz to several GHz) and transfer the signals to the transceiver 991, and may transfer, to the first switch 930, a signal of a frequency band (e.g., a signal of the second frequency band), which does not overlap that of the third communication, among signals of the second communication. In an embodiment, the second diplexer 960 may transfer a signal of the second frequency band (e.g., a signal through the second communication including a frequency band of 7.75 GHz to 8.25 GHz) to the first switch 930, and may transfer a signal of the third communication to the transceiver 991.

In an embodiment, the first switch 930 may be connected to the second communication circuit 920 to switch between the triplexer 940, the second diplexer 960, and the third antenna 980. In an embodiment, the first switch 930 may be implemented as a switch which includes multiple poles connected to at least one a reception port of the second communication circuit 920 and a transmission port of the second communication circuit 920, and multiple output terminals (throws) connected to at least one among the triplexer 940, the second diplexer 960, and/or the third antenna 980. In an embodiment, the first switch 930 in FIG. 9 may include a DP3T. In an embodiment, the second communication circuit may control the first switch 930 in consideration of a frequency band of a reception signal of the second communication or a frequency band of a transmission signal of the second communication.

In an embodiment, the second communication circuit 920 may transfer, to the first communication circuit 910, a signal requesting for receiving a reception signal through the second communication. In an embodiment, signals may be transmitted between the first communication circuit 910 and the second communication circuit 920 via the Coex interface, but is not limited thereto. The second communication circuit 920 may control the first switch 930 to receive a reception signal of the second communication through the first antenna 950.

In an embodiment, the second communication circuit 920 may transmit, to the communication processor 990, a signal requesting for receiving a reception signal through the second communication. The second communication circuit 920 may control the first switch 930 to receive a reception signal of the second communication through the second antenna 970.

In an embodiment, the second communication circuit 920 may transmit, to the first communication circuit 910, a signal requesting for transmitting a transmission signal through the second communication. The second communication circuit 920 may control the first switch 930 to transmit a transmission signal of the second communication through the first antenna 950.

In an embodiment, the second communication circuit 920 may transmit, to the communication processor 990, a signal requesting for transmitting a transmission signal through the second communication. The second communication circuit 920 may control the first switch 930 to transmit a transmission signal of the second communication through the second antenna 970.

In an embodiment, the second communication circuit 920 may control the first switch 930 to perform a first function (e.g., the first function in FIG. 2), a second function (e.g., the second function in FIG. 3), and/or a third function (e.g., the third function in FIG. 4).

In an embodiment, in order to perform the first function, the second communication circuit 920 may simultaneously use the first antenna 950 and the second antenna 970 to transmit and receive a second communication signal. In an embodiment, the second communication circuit 920 may control the first switch 930 so as to be connected to the triplexer 940 and the second diplexer 960, thereby simultaneously transmitting and receiving signals through the second communication. In an embodiment, the second communication circuit 920 may use one of the first antenna 950 and the second antenna 970 to transmit a transmission signal through the second communication, and may use the other to receive a reception signal through the second communication.

In an embodiment, in order to perform the second function, the second communication circuit 920 may use at least one of the first antenna 950 and the second antenna 970 to transmit and receive signals through the second communication. In an embodiment, the second communication circuit 920 may control the first switch 930 so as to be connected to the triplexer 940 and/or the second diplexer 960, thereby transmitting and receiving signals through the second communication by the first antenna 950 and/or the second antenna 970. In an embodiment, the second communication circuit 920 may use one of the first antenna 950 and the second antenna 970 to transmit a transmission signal through the second communication, and may use the identical antenna to receive a reception signal through the second communication. In another embodiment, the second communication circuit 920 may use one of the first antenna 950 and the second antenna to transmit a transmission signal through the second communication, and may use the other antenna to receive a reception signal through the second communication.

In an embodiment, in order to perform the third function, the second communication circuit 920 may use the third antenna 980 to receive a signal through the second communication. In an embodiment, the second communication circuit 920 may control the first switch 930 so as to be connected to the third antenna 980, thereby receiving a signal through the second communication by the third antenna 980. In an embodiment, in order to perform the third function, the second communication circuit 920 may use at least some among the third antenna 980, the fourth antenna 984, and the fifth antenna 985 to receive a signal through the second communication. In an embodiment, the second communication circuit 920 may control a switch (e.g., the SPDT switch 990 in FIG. 9) to switch between the fourth antenna 984 and the fifth antenna 985. In an embodiment, the second communication circuit 920 may perform the third function by controlling the SPDT switch 990 to simultaneously connect the third antenna 980 and the fourth antenna 984 so as to receive a signal of the second communication, or simultaneously connect the third antenna 980 and the fifth antenna 985 so as to receive a signal of the second communication.

An embodiment of an electronic device disclosed herein may include a first communication circuit including a first transmission port which outputs a transmission signal of first communication and a first reception port which receives a reception signal of the first communication, a second communication circuit including a second transmission port which outputs a transmission signal of second communication and a second reception port which receives a reception signal of the second communication, a first branching filter connected to a first antenna and the first communication circuit, a second branching filter connected to a second antenna and the first communication circuit, a first switch connected to the second communication circuit through the second transmission port and the second reception port and connected to switch between the first branching filter, the second branching filter, and a third antenna, and a fourth antenna connected to the second communication circuit through the second reception port. The second communication circuit controls the first switch to perform a first function through which a transmission signal of the second communication is transmitted by one of the first antenna and the second antenna and, simultaneously with the transmission, a reception signal of the second communication is received by a remaining one of the first antenna and the second antenna, controls the first switch to perform a second function through which a transmission signal of the second communication is transmitted by one antenna of the first antenna and the second antenna and a reception signal of the second communication is received by the one antenna, and controls the first switch to perform a third function through which a reception signal of the second communication is received by the third antenna and the fourth antenna.

Furthermore, the second communication circuit may control the first switch to connect the second communication circuit to one of the first branching filter or the second branching filter, based on a frequency band of the transmission signal of the second communication or the reception signal of the second communication.

Furthermore, a frequency band of the second communication may partially overlap a frequency band of the first communication.

Furthermore, the electronic device may include a processor operatively connected to the second communication circuit, and the processor may determines, based on the transmission signal transmitted through the first function and the reception signal received through the first function, a position in which the transmission signal is reflected.

Furthermore, the electronic device may include a processor operatively connected to the second communication circuit, and the processor may determines, based on the transmission signal transmitted through the second function and the reception signal received through the second function, a distance from an external electronic device which has transmitted the reception signal.

Furthermore, electronic device may include a processor operatively connected to the second communication circuit, and the processor may determines, based on the reception signal received through the third function, an AoA of the reception signal.

Furthermore, at least one of the first antenna and the second antenna may include an LDS antenna.

Furthermore, the third antenna may include a patch antenna.

Furthermore, the electronic device may further include a second switch connected to the first communication circuit through the first transmission port and the first reception port, and connected to the first branching filter so as to switch between the first communication circuit and the first switch, and a third switch connected to the first communication circuit through the first transmission port and the first reception port, and connected to the second branching filter so as to switch between the first communication circuit and the first switch. The second communication circuit controls, when the first function is performed, the second switch and the third switch to transfer a signal of at least a partial frequency band, among reception signals of the second communication received through the first antenna or the second antenna, to the second communication circuit through the first switch, and transmit a signal of at least a partial frequency band, among transmission signals of the second communication, to the outside through the first antenna or the second antenna.

Furthermore, the signal of the at least partial frequency band may include a frequency band overlapping a frequency band of the first communication.

Furthermore, the first branching filter may be connected to the first communication circuit so as to transfer a signal having a frequency band which does not overlap the frequency band of the second communication, among signals of the first communication, such that the signal is transmitted or received through the first antenna, and may be connected to the second switch so as to transfer a signal having a frequency band overlapping the frequency band of the second communication among the signals of the first communication and a signal having a frequency band overlapping the frequency band of the first communication among signals of the second communication such that the signals are transmitted or received through the first antenna.

Furthermore, the second branching filter may be connected to the first communication circuit so as to transfer a signal having a frequency band which does not overlap the frequency band of the second communication, among signals of the first communication, such that the signal is transmitted or received through the second antenna, and may be connected to the third switch so as to transfer a signal having a frequency band overlapping the frequency band of the second communication among the signals of the first communication and a signal having a frequency band overlapping the frequency band of the first communication among signals of the second communication such that the signals are transmitted or received through the second antenna.

Furthermore, the second communication may include UWB communication, and the at least partial frequency band may include a frequency band of 6.25 GHz to 6.75 GHz.

Furthermore, the electronic device may further include a third communication circuit including a third transmission port which outputs a transmission signal of third communication and a third reception port which receives a reception signal of the third communication, the second branching filter may be connected to the second antenna, the first switch, and the third communication circuit, a reception signal of the third communication, among signals received by the second antenna, may be transferred to the third communication circuit through the second branching filter, and a reception signal of the second communication, among signals received by the second antenna, may be transferred to the first switch through the second branching filter.

Furthermore, the third communication may include cellular communication.

Furthermore, the first communication may include Bluetooth or WiFi communication, and the second communication may include UWB communication.

Furthermore, the electronic device may further include a fourth switch connected to the second communication circuit through the second reception port, and a fifth antenna connected to the fourth switch. The second communication circuit controls, when the third function is performed, the first switch and/or the fourth switch to receive a reception signal of the second communication by two antennas among the third antenna, the fourth antenna, and the fifth antenna.

An embodiment of the electronic device disclosed herein may be one of various types of electronic devices. The electronic devices may include a portable communication device (e.g., a smart phone), a computer device, a portable multimedia device, a portable medical device, a camera, a wearable device, or a home appliance, for example. The electronic device in embodiments of the invention is not limited to those described above.

It should be appreciated that various embodiments of the invention and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other feature (e.g., importance or order). It is to be understood that when an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, e.g., "logic," "logic block," "component," or "circuit". The "module" may be a minimum unit of a single integrated component adapted to perform one or more functions, or a part thereof. In an embodiment, in an embodiment, the "module" may be implemented in the form of an application-specific integrated circuit ("ASIC").

Various embodiments as set forth herein may be implemented as software (e.g., the program 140) including one or more instructions that are stored in a storage medium (e.g., the internal memory 136 or external memory 138) that is readable by a machine (e.g., the electronic device 101). In an embodiment, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment according to the invention, a method may be included and provided in a computer program product. The computer program product may be traded as a product between a seller and a buyer. The computer program product may be distributed in the form of a machine-readable storage medium (e.g., compact disc read only memory ("CD-ROM")), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

In an embodiment, each element (e.g., a module or a program) of the above-described elements may include a single entity or multiple entities, and some of the multiple entities may be separately disposed in any other element. In an embodiment, one or more of the above-described elements may be omitted, or one or more other elements may be added. In an alternative embodiment or additionally, a plurality of elements (e.g., modules or programs) may be integrated into a single element. In such a case, in an embodiment, the integrated element may still perform one or more functions of each of the plurality of elements in the same or similar manner as they are performed by a corresponding one of the plurality of elements before the integration. In an embodiment, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
   a first communication circuit comprising:
      a first transmission port which outputs a transmission signal of first communication; and
      a first reception port which receives a reception signal of the first communication;
   a second communication circuit comprising:
      a second transmission port which outputs a transmission signal of second communication; and
      a second reception port which receives a reception signal of the second communication;
   a first branching filter connected to a first antenna and the first communication circuit;
   a second branching filter connected to a second antenna and the first communication circuit;
   a first switch connected to the second communication circuit through the second transmission port and the second reception port and connected to switch between the first branching filter, the second branching filter, and a third antenna; and
   a fourth antenna connected to the second communication circuit through the second reception port,
   wherein the second communication circuit:
      controls the first switch to perform a first function through which a transmission signal of the second communication is transmitted by one of the first antenna and the second antenna and, simultaneously with the transmission, a reception signal of the second communication is received by a remaining one of the first antenna and the second antenna,
      controls the first switch to perform a second function through which a transmission signal of the second communication is transmitted by one antenna of the first antenna and the second antenna and a reception signal of the second communication is received by the one antenna, and
      controls the first switch to perform a third function through which a reception signal of the second communication is received by the third antenna and the fourth antenna.

2. The electronic device of claim 1, wherein the second communication circuit controls the first switch to connect the second communication circuit to one of the first branching filter or the second branching filter, based on a frequency band of the transmission signal of the second communication or the reception signal of the second communication.

3. The electronic device of claim 1, wherein a frequency band of the second communication partially overlaps a frequency band of the first communication.

4. The electronic device of claim 1, further comprising a processor operatively connected to the second communication circuit,
   wherein the processor determines, based on the transmission signal transmitted through the first function and the reception signal received through the first function, a position in which the transmission signal is reflected.

5. The electronic device of claim 1, further comprising a processor operatively connected to the second communication circuit,
   wherein the processor determines, based on the transmission signal transmitted through the second function and the reception signal received through the second function, a distance from an external electronic device which has transmitted the reception signal.

6. The electronic device of claim 1, further comprising a processor operatively connected to the second communication circuit,
   wherein the processor determines, based on the reception signal received through the third function, an angle of arrival ("AoA") of the reception signal.

7. The electronic device of claim 1, wherein at least one of the first antenna and the second antenna comprises a laser direct structuring antenna ("LDS" antenna).

8. The electronic device of claim 1, wherein the third antenna comprises a patch antenna.

9. The electronic device of claim 1, further comprising:
   a second switch which is connected to the first communication circuit through the first transmission port and the first reception port, is connected to the first branching filter, and switches between the first communication circuit and the first switch; and
   a third switch which is connected to the first communication circuit through the first transmission port and the first reception port, and is connected to the second branching filter, and switches between the first communication circuit and the first switch,
   wherein the second communication circuit controls, when the first function is performed, the second switch and the third switch to:
      transfer a signal of at least a partial frequency band, among reception signals of the second communication received through the first antenna or the second antenna, to the second communication circuit through the first switch, and
      transmit a signal of at least a partial frequency band, among transmission signals of the second communication, to an outside through the first antenna or the second antenna.

10. The electronic device of claim 9, wherein the signal of the at least partial frequency band comprises a frequency band overlapping a frequency band of the first communication.

11. The electronic device of claim 9, wherein the first branching filter is connected to the first communication circuit and transfers a signal having a frequency band which does not overlap a frequency band of the second communication, among signals of the first communication, and the transferred signal is transmitted or received through the first antenna, and the first branching filter is connected to the second switch and transfers a signal having a frequency band overlapping the frequency band of the second communication among the signals of the first communication and a signal having a frequency band overlapping a frequency band of the first communication among signals of the second communication, and the transferred signals are transmitted or received through the first antenna.

12. The electronic device of claim 9, wherein the second branching filter is connected to the first communication circuit and transfers a signal having a frequency band which does not overlap a frequency band of the second communication, among signals of the first communication, and the transferred signal is transmitted or received through the second antenna, and the second branching filter is connected to the third switch and transfers a signal having a frequency band overlapping the frequency band of the second communication among the signals of the first communication and a signal having a frequency band overlapping a frequency band of the first communication among signals of the second communication, and the transferred signals are transmitted or received through the second antenna.

13. The electronic device of claim 9, wherein the second communication comprises ultra-wide band ("UWB") communication, and the at least partial frequency band comprises a frequency band of 6.25 gigahertz to 6.75 gigahertz.

14. The electronic device of claim 1, further comprising a third communication circuit comprising a third transmission port which outputs a transmission signal of third communication and a third reception port which receives a reception signal of the third communication, wherein the second branching filter is connected to the second antenna, the first switch, and the third communication circuit, a reception signal of the third communication, among signals received by the second antenna, is transferred to the third communication circuit through the second branching filter, and a reception signal of the second communication, among signals received by the second antenna, is transferred to the first switch through the second branching filter.

15. The electronic device of claim 14, wherein the third communication comprises cellular communication.

16. The electronic device of claim 1, wherein the first communication comprises Bluetooth or wireless fidelity ("WiFi") communication, and the second communication comprises ultra-wide band ("UWB") communication.

17. The electronic device of claim 1, further comprising:
a fourth switch connected to the second communication circuit through the second reception port; and
a fifth antenna connected to the fourth switch,
wherein the second communication circuit controls, when the third function is performed, at least one of the first switch and the fourth switch to receive a reception signal of the second communication by two antennas among the third antenna, the fourth antenna, and the fifth antenna.

18. An electronic device comprising:
a first communication circuit which outputs a transmission signal of first communication and receives a reception signal of the first communication;
a second communication circuit which outputs a transmission signal of second communication and receives a reception signal of the second communication;
a first branching filter connected to a first antenna and the first communication circuit;
a second branching filter connected to a second antenna and the first communication circuit;
a first switch connected to the second communication circuit and switches between the first branching filter, the second branching filter, and a third antenna; and
a fourth antenna connected to the second communication circuit,
wherein the second communication circuit:
controls the first switch to perform a first function through which a transmission signal of the second communication is transmitted by one of the first antenna and the second antenna and, simultaneously with the transmission, a reception signal of the second communication is received by a remaining one of the first antenna and the second antenna,
controls the first switch to perform a second function through which a transmission signal of the second communication is transmitted by one antenna of the first antenna and the second antenna and a reception signal of the second communication is received by the one antenna, and
controls the first switch to perform a third function through which a reception signal of the second communication is received by the third antenna and the fourth antenna.

19. The electronic device of claim 18, wherein the second communication circuit controls the first switch to connect the second communication circuit to one of the first branching filter or the second branching filter, based on a frequency band of the transmission signal of the second communication or the reception signal of the second communication.

20. The electronic device of claim 18, wherein a frequency band of the second communication partially overlaps a frequency band of the first communication.

* * * * *